Oct. 1, 1957     J. R. SQUIRE ET AL     2,807,916
SIMULTANEOUS EXTERNAL AND INTERNAL CENTERLESS GRINDING MACHINE
Filed April 12, 1954     10 Sheets-Sheet 2
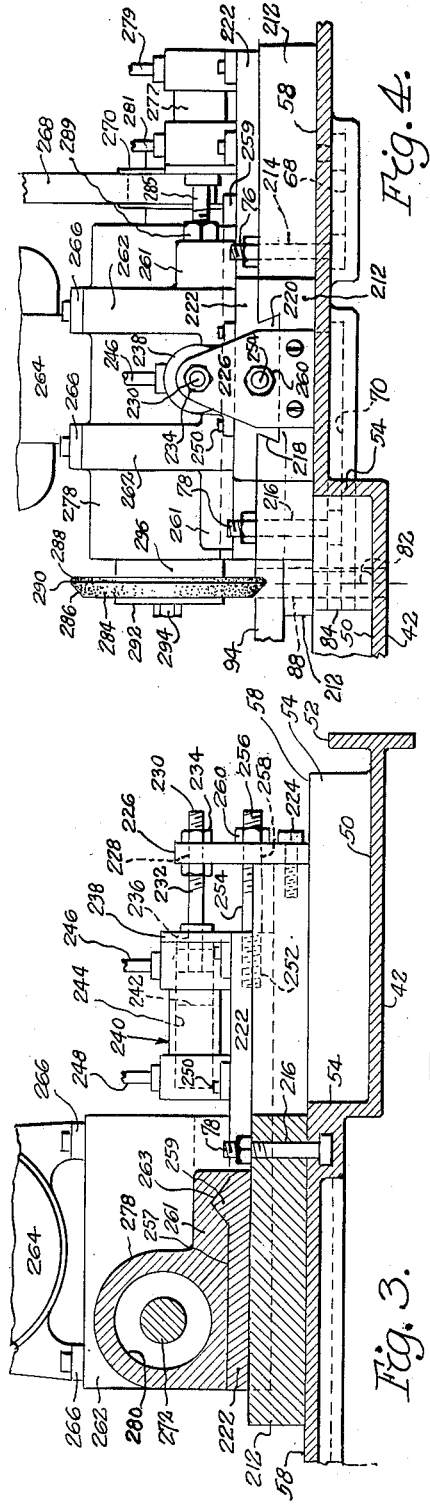
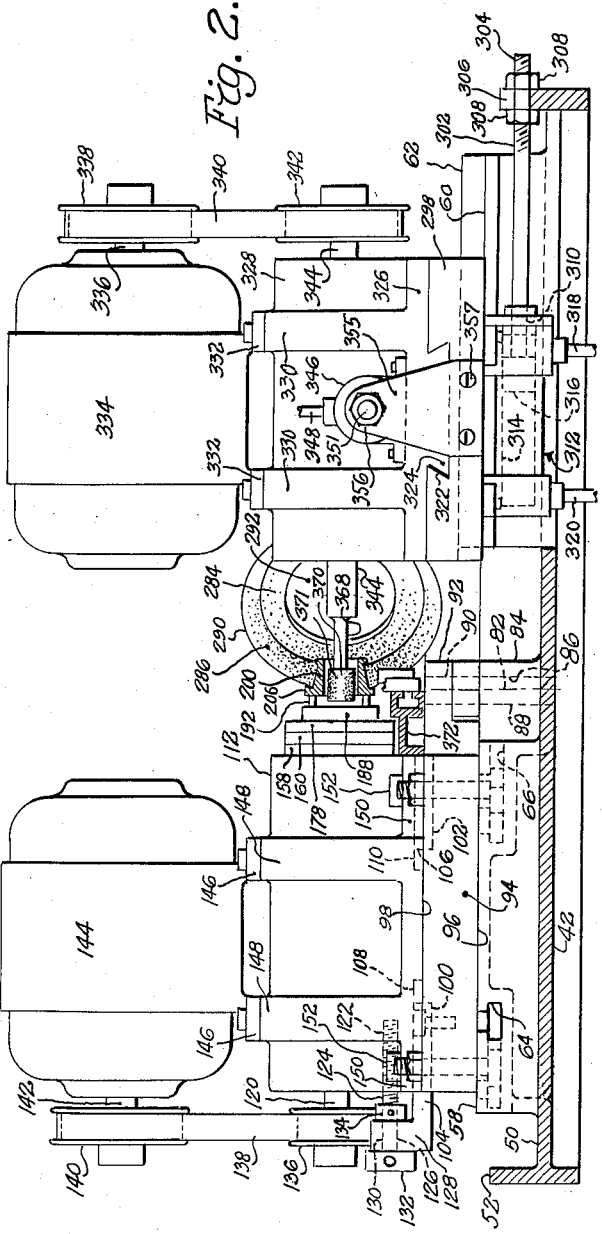
INVENTOR.
John R. Squire
BY Herman A. Ortegren
Barthel & Bugbee
Attys

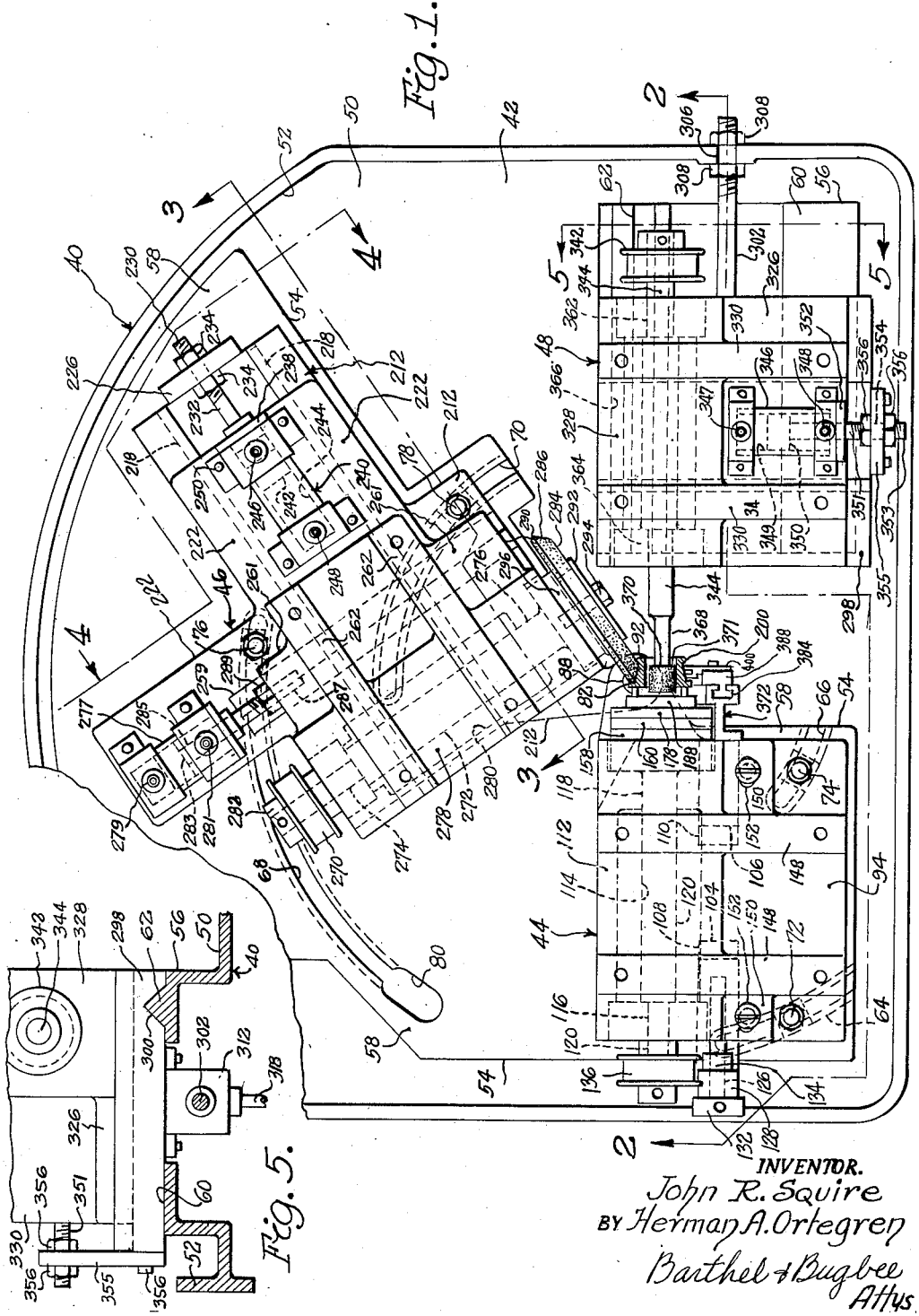

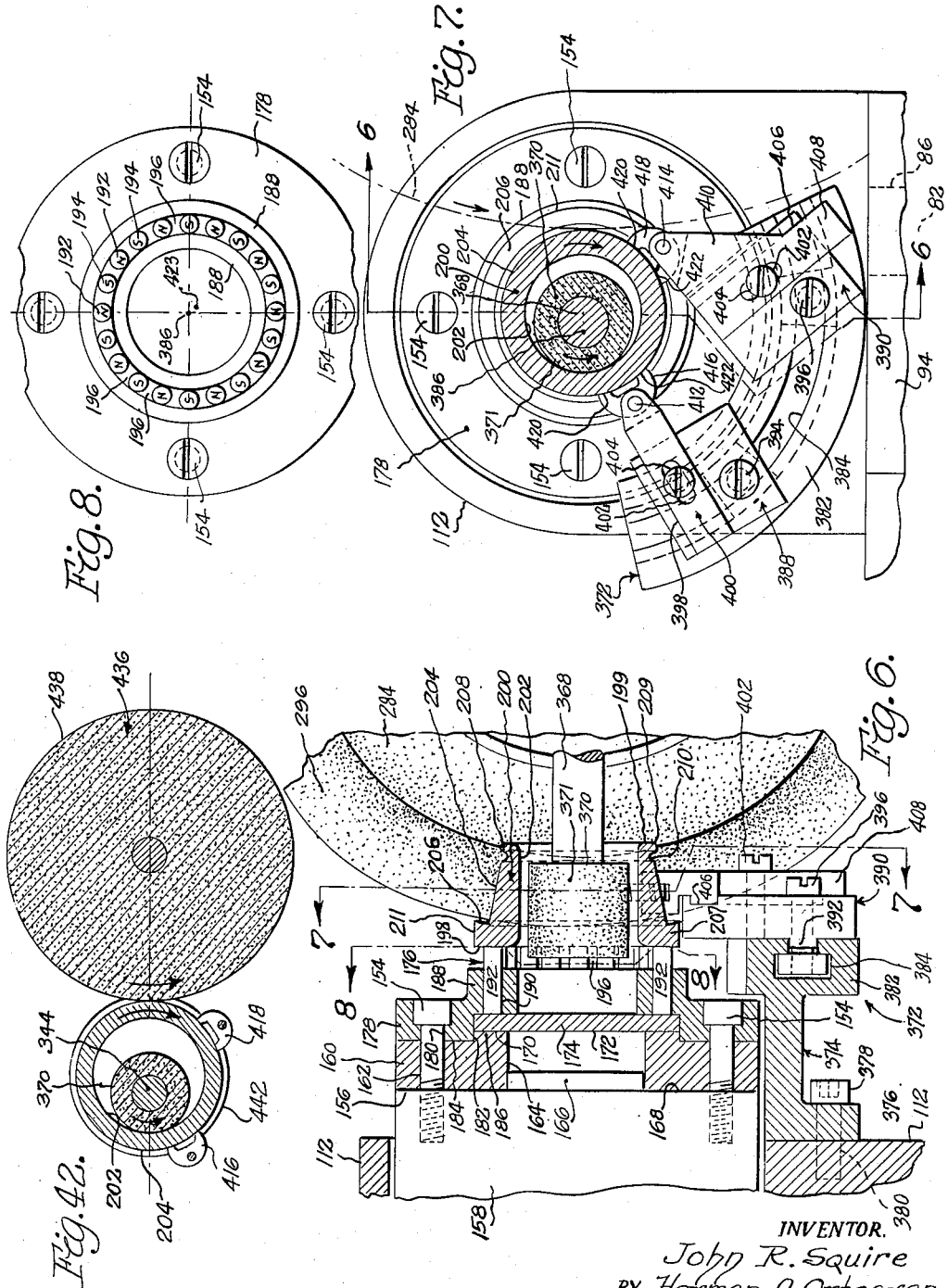

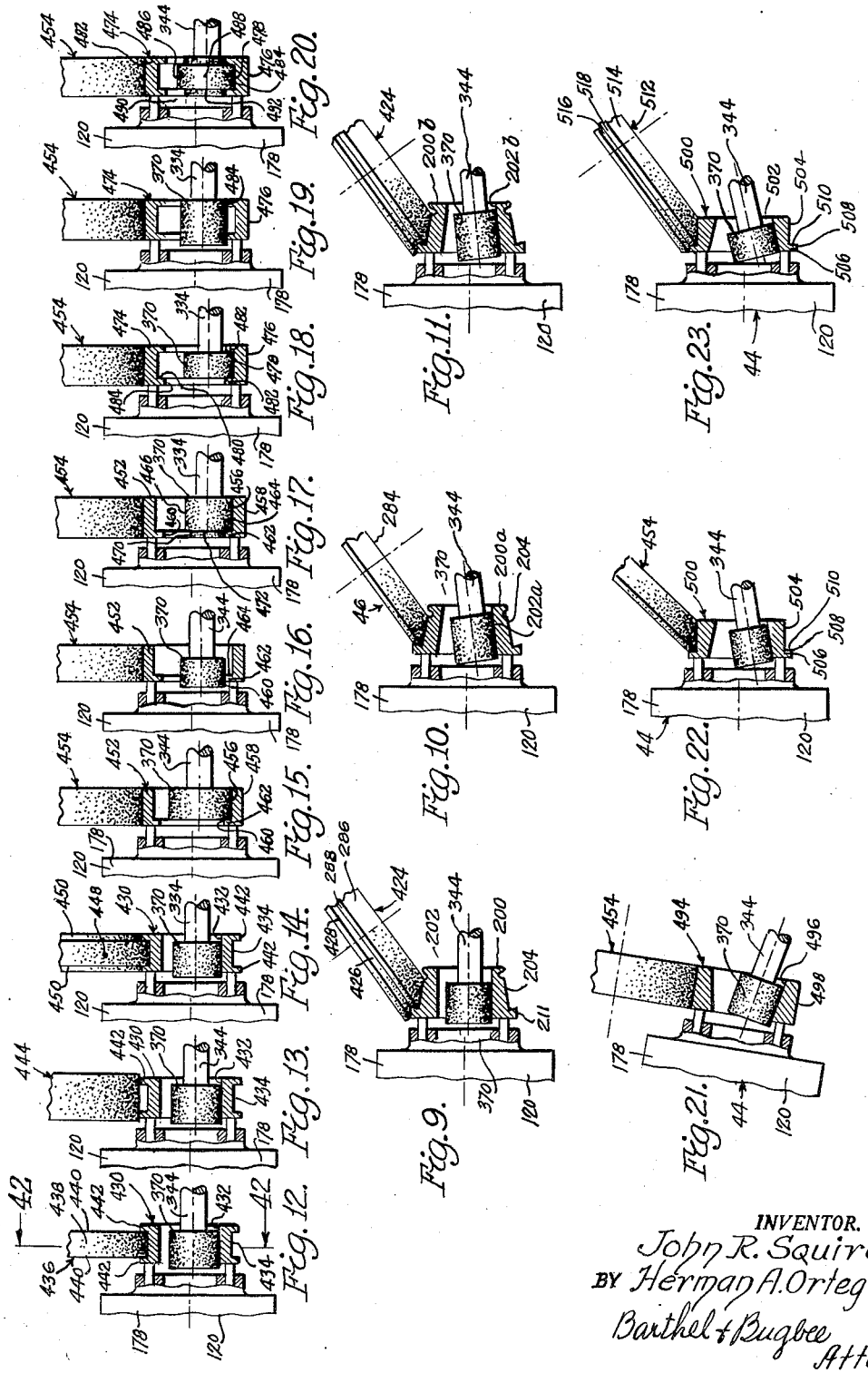

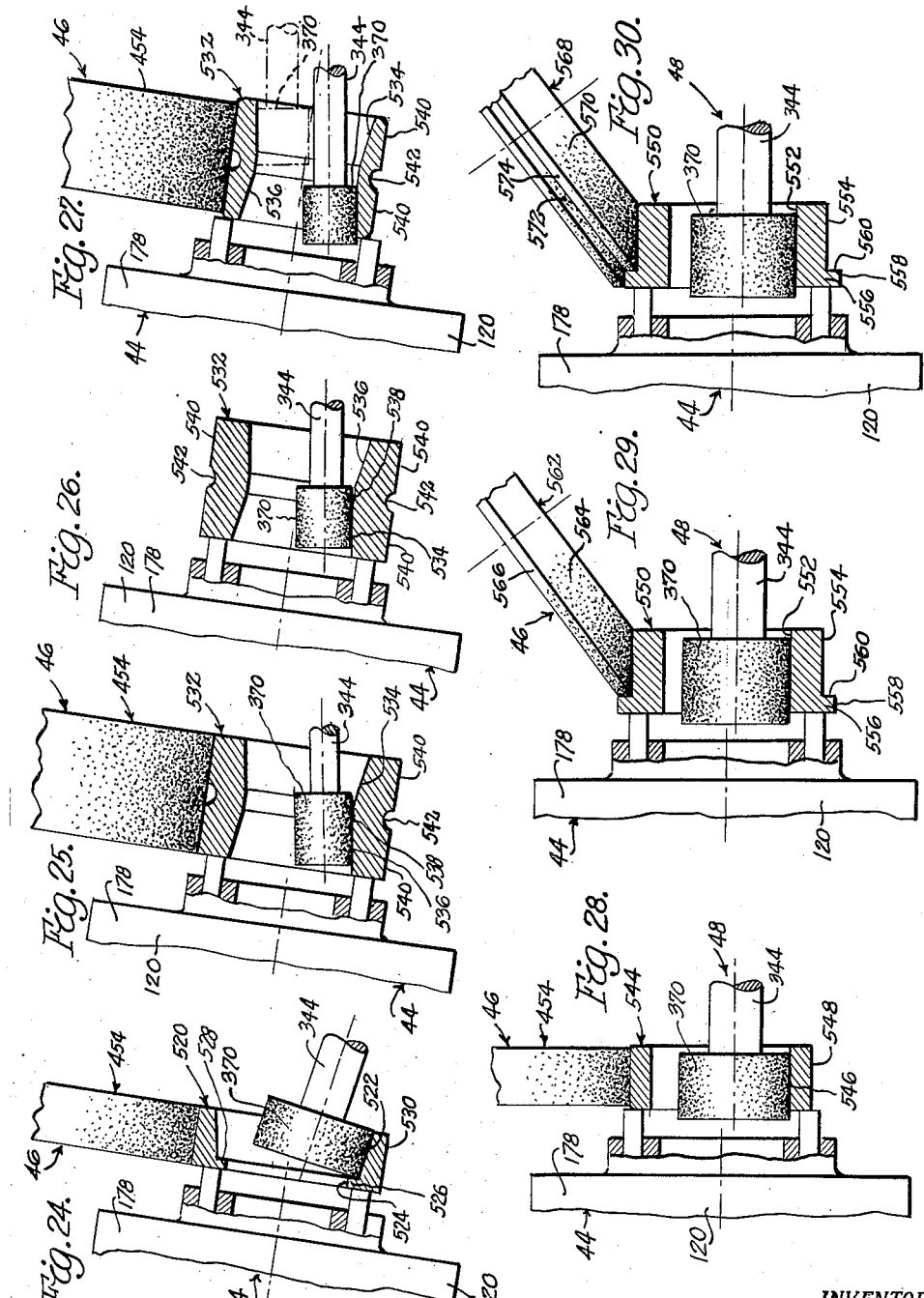

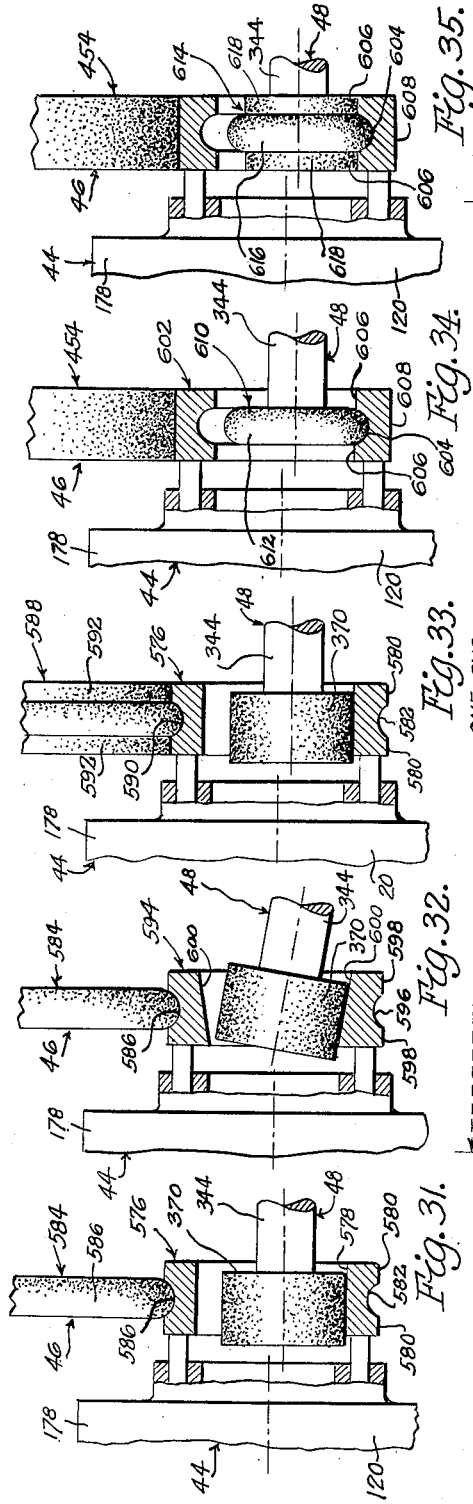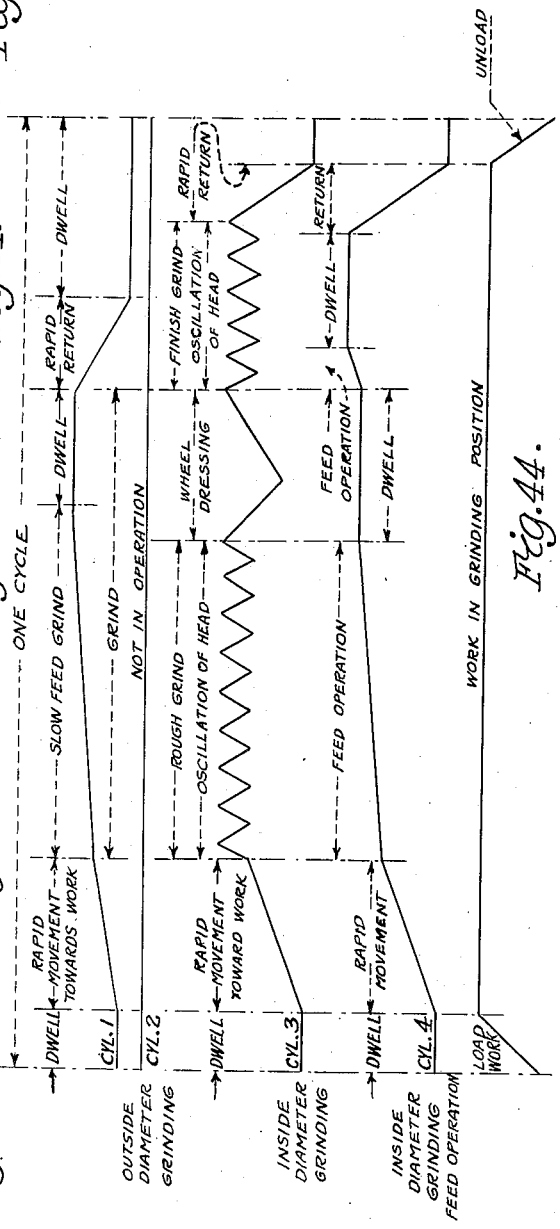

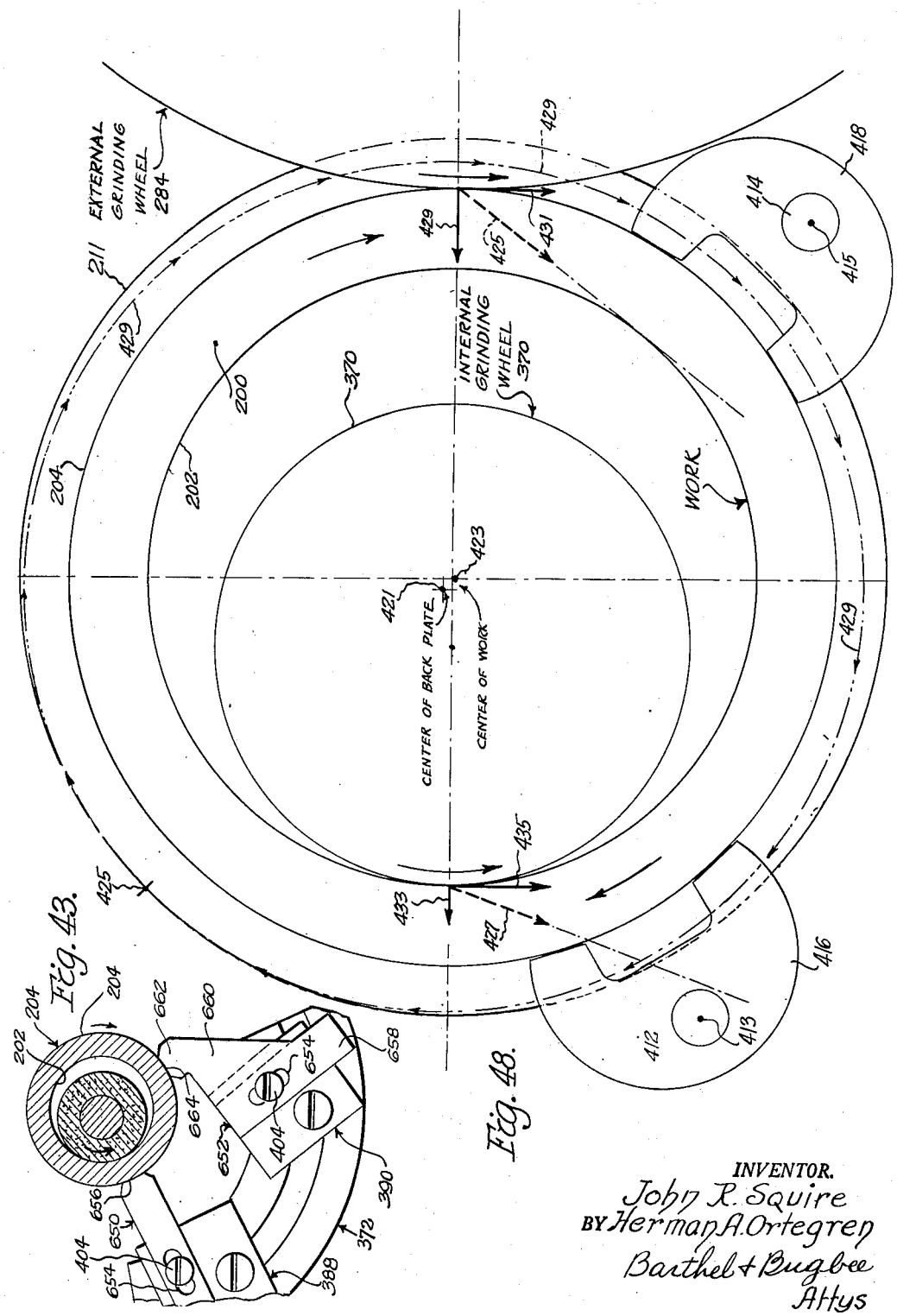

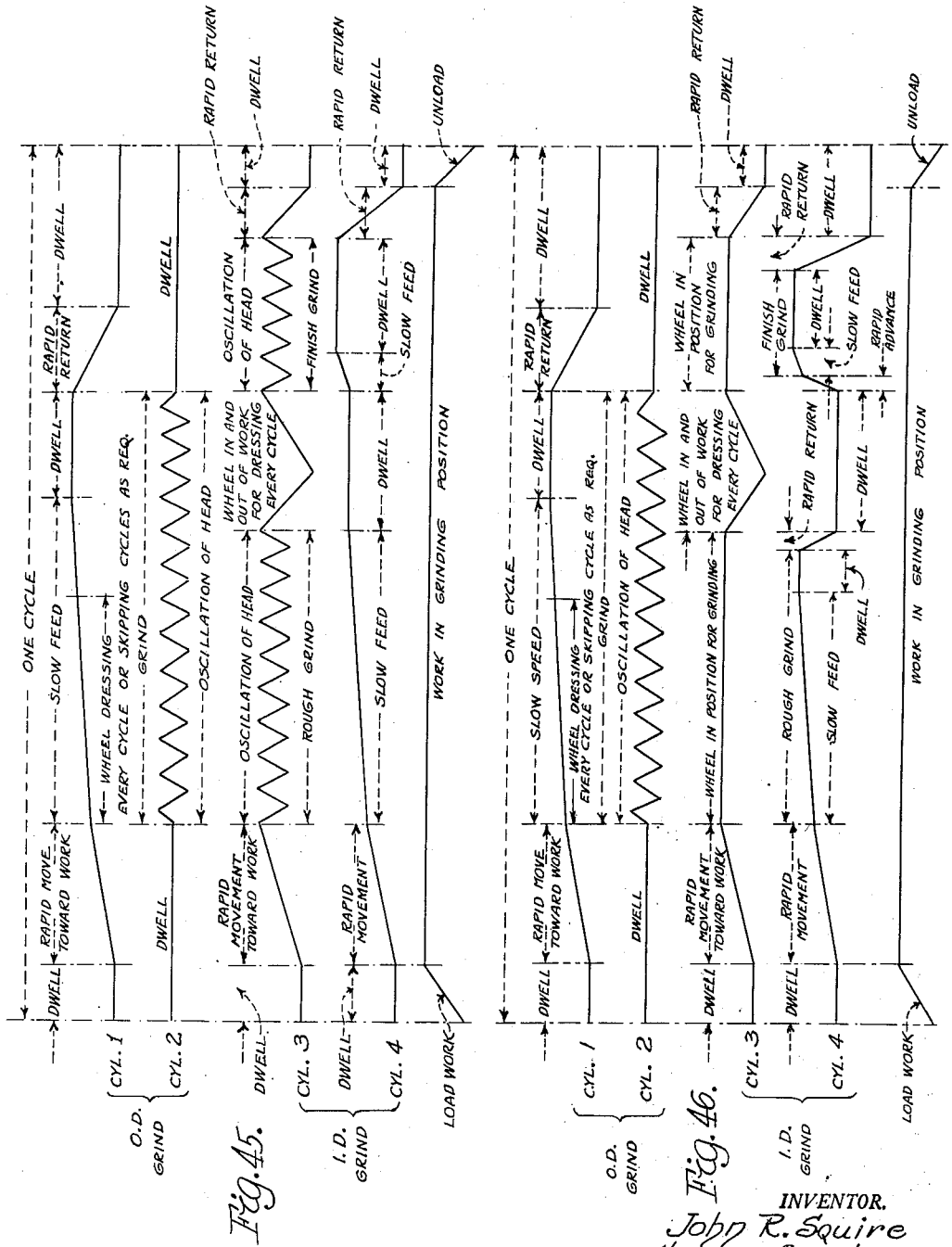

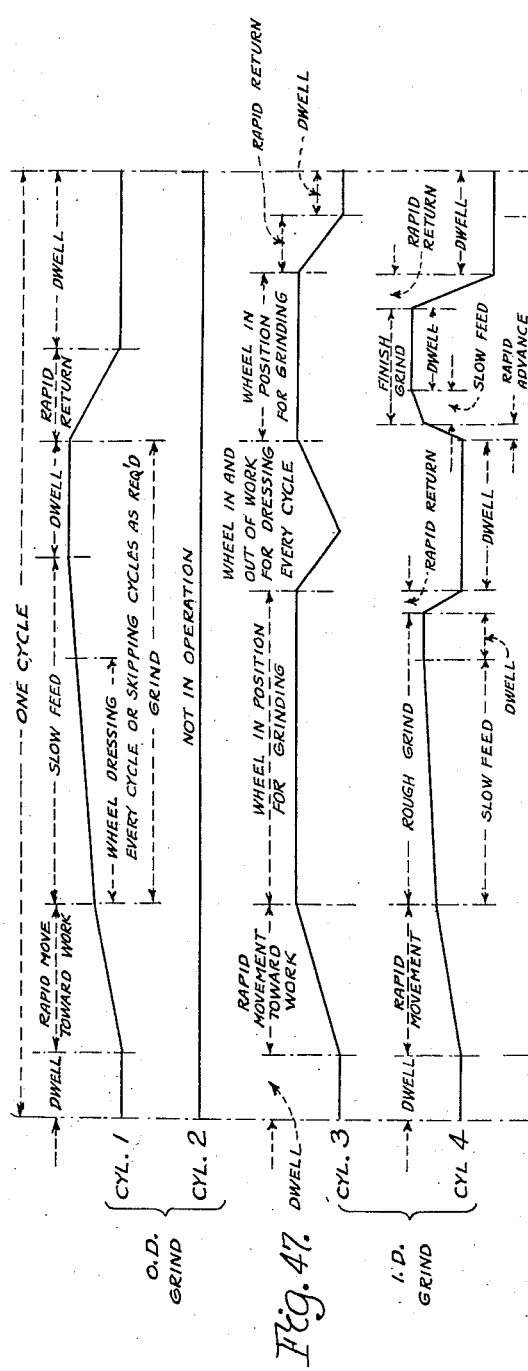
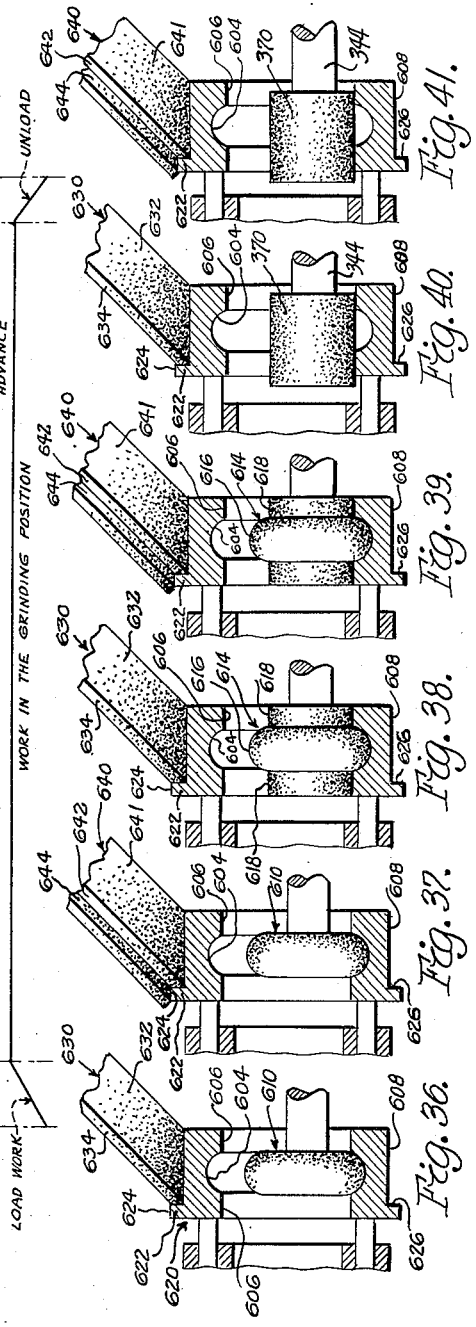

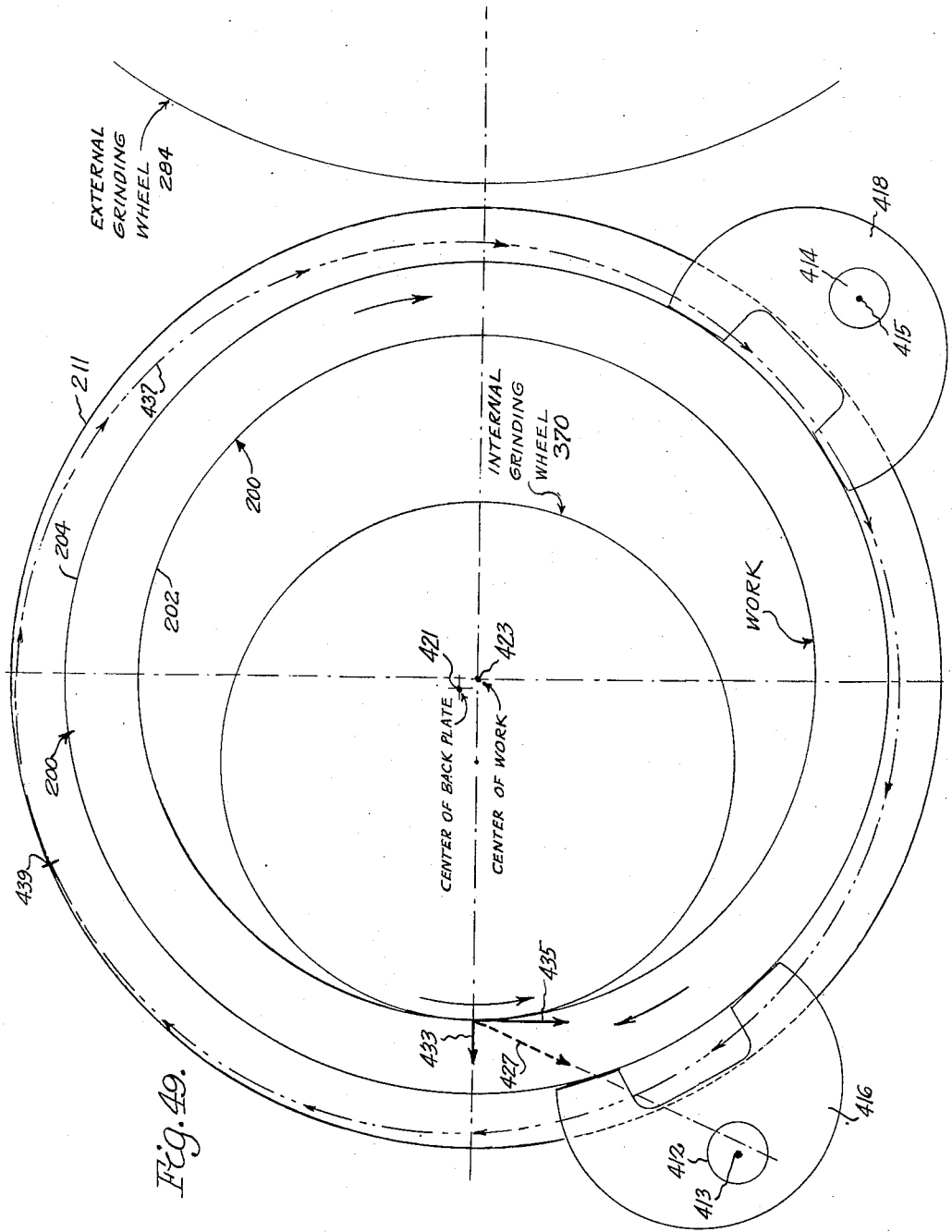

United States Patent Office 2,807,916
Patented Oct. 1, 1957

2,807,916

SIMULTANEOUS EXTERNAL AND INTERNAL CENTERLESS GRINDING MACHINE

John R. Squire and Herman A. Ortegren, Grosse Pointe, Mich., assignors, by mesne assignments, to Federal-Mogul-Bower Bearings, Inc., Detroit, Mich., a corporation of Michigan Application April 12, 1954, Serial No. 422,302

14 Claims. (Cl. 51—88)

This invention relates to grinding machines and, in particular, to centerless grinding machines.

One object of this invention is to provide a simultaneous external and internal centerless grinding machine which will simultaneously grind external and internal surfaces upon a workpiece rotatably mounted in the machine, thereby eliminating the necessity for and expense of the two separate machines hitherto required for separately grinding the external and internal surfaces, as well as conserving floor space, eliminating rehandling and repositioning of the workpiece from one machine to another with their consequent errors, and reducing labor costs.

Another object is to provide a simultaneous external and internal centerless grinding machine, as set forth in the object immediately preceding, wherein the rotation of the workpiece and the simultaneous grinding of its external and internal surfaces by the external and internal grinding wheels pressing simultaneously against the outer and inner sides of the workpiece wall results in the two grinding wheels cooperating with one another to produce thrusts which hold the workpiece more firmly against its supporting blades or rests during such rotation and grinding, and wherein the opposite ends of the workpiece will be ground accurately square with the axis of the internal and external surfaces ground on the present machine, and wherein these external end surfaces will be ground accurately coaxial with one another, avoiding the errors, in these respects, of separate prior machines for externally and internally grinding such workpieces.

Another object is to provide a simultaneous external and internal centerless grinding machine of the foregoing character wherein the workpieces are held and rotated by a magnetic chuck or back plate of special design, and supported in part by rests during the simultaneous external and internal grinding of the workpieces, enabling the workpieces to be rapidly fed to and expelled from the chuck, yet to be firmly held against accidental displacement during grinding and completely accessible for simultaneous grinding of both its external and internal surfaces.

Another object is to provide a simultaneous external and internal centerless grinding machine of the foregoing character wherein the grinding wheel spindles and the work spindles are mounted on carriages which are adjustable not only toward and away from one another but also angularly relatively to one another, and wherein the various spindles are further provided with means for axially adjusting or reciprocating the grinding wheel spindles relatively to the work spindle so as to cause the external and internal grinding wheels to properly engage, grind, and withdraw from engagement with the workpiece after grinding.

Another object is to provide a simultaneous external and internal centerless grinding machine of the foregoing character wherein a single workpiece rotating unit serves both the external and internal grinding units, thereby providing a single grinding machine for both external and internal grinding simultaneously, thus greatly reducing the number of parts in the two separate external and internal grinding machines hitherto required for these operations by dispensing with the additional workpiece rotating unit and also the additional parts of the hydraulic and electrical control circuit otherwise required in two separate machines.

Other objects and advantages of the invention will become apparent during the course of the following description of the accompanying drawings, wherein:

Figure 1 is a top plan view of a simultaneous external and internal centerless grinding machine, according to one form of the invention, the three driving motors and the loading, unloading, wheel-dressing and controlling mechanisms having been omitted for clearness and simplicity of showing;

Figure 2 is a front elevation, partly in section, along the line 2—2 in Figure 1, of the machine shown in Figure 1;

Figure 3 is a longitudinal section through the external grinding wheel carriage and adjacent structure, taken along the line 3—3 in Figure 1;

Figure 4 is a cross-section through the machine of Figure 1, taken along the line 4—4 therein, with the external grinding wheel carriage shown in rear elevation;

Figure 5 is a cross-section through the machine of Figure 1, taken along the line 5—5 therein, with the internal grinding wheel carriage shown in rear elevation;

Figure 6 is an enlarged longitudinal fragmentary sectional view of the central portion of Figure 2, showing the workpiece, the magnetic chuck, the external and internal grinding wheels, and the adjacent structure;

Figure 7 is a cross-section through the workpiece and internal grinding wheel taken along the line 7—7 in Figure 6;

Figure 8 is a fragmentary cross-section taken along the line 8—8 in Figure 6, showing the magnetic back plate for holding the workpiece during grinding;

Figures 9 to 11 inclusive are fragmentary diagrammatic sections showing the adaptation of the machine to grinding inner races of tapered roller bearings;

Figures 12 to 14 inclusive, 29 and 30 are fragmentary diagrammatic sections showing the adaptation of the machine to grinding inner races of straight roller bearings;

Figures 15 to 20 inclusive are fragmentary diagrammatic sections showing the adaptation of the machine to grinding outer races of straight roller bearings;

Figures 21 to 27 inclusive are fragmentary diagrammatic sections showing the adaptation of the machine to grinding outer races of tapered roller bearings;

Figure 28 is a fragmentary diagrammatic section showing the adaptation of the machine to grinding either inner or outer races of straight roller bearings;

Figures 31 to 33 inclusive are fragmentary diagrammatic sections showing the adaptation of the machine to grinding inner races of ball bearings;

Figures 34 to 41 inclusive are fragmentary diagrammatic sections showing the adaptation of the machine to grinding outer races of ball bearings;

Figure 42 is an enlarged fragmentary diagrammatic cross-section taken along the line 42—42 in Figure 12, showing how the grinding wheels preferably engage the internal and external surfaces of the workpiece at their points of nearest possible approach so as to counterbalance the opposing thrusts of the two grinding wheels upon the workpiece;

Figure 43 is a view similar to Figure 7 with portions omitted and showing modified work rests usable in place of the rocking shoes of Figure 7;

Figure 44 is an operating cycle diagram of the machine, showing the relative timing of the different operations, where the external grinding wheel is not oscillated during grinding;

Figure 45 is an operating cycle diagram of the machine, showing the relative timing of the different operations, where both the external and internal grinding wheels are oscillated during grinding;

Figure 46 is an operating cycle diagram of the machine, showing the relative timing of the different operations, where the external grinding wheel is oscillated along its axis of rotation;

Figure 47 is an operating cycle diagram of the machine, showing the relative timing of the different operations, where neither of the grinding wheels is oscillated;

Figure 48 is an enlarged force diagram of Figure 7, showing the components of force exerted by the simultaneous grinding action of the external and internal grinding wheels in urging the workpiece against the workpiece rests; and Figure 49 is an enlarged force diagram similar to Figure 48, but showing the components of force exerted by the grinding action of the internal grinding wheel alone, in urging the workpiece against the workpiece rests.

Prior practice and the present invention

Hitherto, the centerless grinding of workpieces having external and internal ground surfaces has been carried out on separate external and internal centerless grinding machine, with the workpieces being transferred from one machine to the other machine for the separate grinding of the external and internal surfaces. This prior practice thus required two different sets of machines with a consequently large allocation of floor space for the separate types of machines. Moreover, the rehandling of the workpieces occasioned by first setting them up in the external grinding machine and afterward transferring them to the internal grinding machine and setting them up therein was the source of occasional errors, especially when a particle of dirt or grit between the workpiece and its support caused the workpiece to be ground while slightly displaced from its proper position. The separate external and internal grinding machines also required feeding and expelling mechanisms for each machine, together with separate controls and driving mechanism and electrical systems. Such separate machines also required separate workmen for operating and supervising the operation of these separate external and internal grinding machines. Finally, the so-called "centerless throughfeed" grinding of the external surfaces of the workpiece, wherein the workpiece is passed between a cylindrical grinding wheel and a cylindrical control wheel, caused errors and inaccuracies in the workpieces resulting in their ends being angled relatively to their axes ("off square"), out of round and possessing imperfections arising from chatter.

The present invention solves these problems, eliminates these defects and overcomes these disadvantages of separate external and internal grinding machines by providing a single centerless grinding machine which simultaneously grinds both the external and the internal surfaces of the workpiece. This machine saves much space in the factory by eliminating the additional space required for the separate sets of machines, eliminates rehandling and rechucking of the workpieces with possible error, and eliminates the duplication of the workpiece feeding, chucking, rotating and expelling mechanism hitherto required in separate external and internal centerless grinding machines. The machine of the present invention also greatly reduces the labor required for operating or supervising the operation of the machines or for setting up the machines for operation, and cuts down both the cost and time of producing a workpiece. More accurate workpieces with ends precisely perpendicular to their axes ("square"), and outer and inner surfaces truly round and free from chatter imperfections, result from the simultaneous external and internal centerless grinding machine of the present invention not only from the elimination of rehandling and rechucking of the workpiece but also from the fact that the thrusts by the outer and inner grinding wheels against the workpiece produce a crowding effect which forces the workpiece more firmly against the work rests or blades which support it during grinding.

General arrangement

Referring to the drawings in detail, Figures 1 to 8 inclusive show a simultaneous external and internal centerless grinding machine, generally designated 40, according to one form of the invention as consisting generally of a base 42, upon which is adjustably mounted a workpiece rotating unit 44, an external grinding unit 46 and an internal grinding unit 48. For simplicity of showing, the mechanism provided for automatically controlling the machine, dressing or truing the grinding wheels, automatically loading and unloading the workpieces and sizing the workpieces has been omitted as these mechanisms are not being claimed and their details are beyond the scope of the present invention. For the sake of simplicity and clearness of showing, therefore, the machine is illustrated in the accompanying drawing as being loaded and unloaded by hand, and the feeding and traversing motion of the grinding wheels and carriage stops are shown as manually adjustable rather than automatically adjustable or power-operated.

The main base 42 is preferably a casting and is supported upon legs or upon a conventional pedestal structure (not shown) forming no part of the invention and therefore omitted for compactness of showing, the main base 42 being provided with a horizontal portion 50 different portions of which are on different levels, and surrounded by a lip or edge flange 52 which serves not only to strengthen the main base 42 but also to prevent sliding off of liquids, particles of workpiece or grinding wheel material, or workpieces themselves onto the floor of the factory. The main base 42 is provided with a large raised central portion 54 of irregular outline resembling an island or plateau, and extending beneath both the workpiece rotating unit 44 and the external grinding unit 46. The base 42 is also provided with a smaller raised portion or island 56 of a similar nature and similarly supporting the internal grinding unit 48. The raised portion or island 54 has a machined flat surface 58 for receiving the workpiece-rotating unit 44 and the external grinding unit 46, whereas the smaller island 56 has a similar machined flat surface 60 for the same purpose and on the same horizontal level. The surface 60 has a gib or horizontal guide rib 62 of V-shaped cross-section (Figure 5) rising therefrom for guidance of the internal grinding unit 48, as described below. The large raised portion or island 54 has four arcuate guide slots therein, namely two arcuate guide slots 64 and 66 for the workpiece rotating unit 44 and two arcuate guide slots 68 and 70 for the external grinding unit 46 (Figure 1). These arcuate guide slots 64, 66, 68 and 70 are T-slots (Figure 2) for reception of headed clamping bolts 72, 74, 76 and 78 respectively. The arcuate slots 64, 66 and 70 extend through to the side of the island 54, hence readily receive the heads of their respective bolts 72, 74, 76 and 78. The arcuate T-slot 68, however, terminates at both ends within the large island or raised portion 54, hence is provided with an enlarged access opening 80 sufficiently large to pass the head of the bolt 76. The arcuate slots 64, 66, 68 and 70 are circular and, although of different radii, all have a common center located at the point which, as we shall see later is the point over which the sharp edge of the external grinding wheel lies when the machine is properly adjusted for operation (Figure 1).

Work-rotating unit

Integral with and rising from the main base 42 immediately adjacent the center or axis 82 is a boss 84 which is bored vertically as at 86 to receive a vertical pivot shaft 88 (Figure 2). The pivot shaft 88 extends upward above the level of the top surface 58 of the main island or raised portion 54 of the main base 42, and has its axis coincident with the common center 82 of the arcuate slots 64, 66, 68 and 70 mentioned above.

Pivotally mounted on the pivot shaft 88 and bored as at 90 to receive the same is a tongue 92 which is spaced above the level of the surface 58 and which extends to the left to the work-piece rotating unit base 94 with which it is integral. The unit base 94 is in the form of a rectangular block or box, and has a machined lower surface 96 adapted to slidably engage the machined upper surface 58 of the raised portion 54 of the main base 42. The unit base 94 thus swings to and fro across the surface 58 around the pivot shaft 88 and center 82 as an axis, and is clamped in any given position by the pair of bolts 72 and 74, the heads of which are seated in the arcuate slots 64 and 66 respectively.

The upper surface 98 of the unit base 94 is provided with a pair of grooves 100 and 102 respectively adapted to receive rectangular bar-shaped keys 104 and 106 bolted or otherwise fixedly secured within their respective grooves 100 and 102. The bar keys 104 and 106 are of greater thickness than the depths of the grooves 100 and 102 so that they project above the surface 98 and are received in correspondingly-shaped elongated guide grooves 108 and 110 respectively. The guide grooves 108 and 110 are sufficiently longer than their respective keys 104 and 106 to enable the work-rotating spindle head 112 mounted thereon to be moved back and forth in the direction of the keys 104 and 106, which are disposed in alignment with one another.

The work-rotating spindle head 112 (Figures 1 and 2) is roughly in the form of a cylindrical block which is centrally and longitudinally bored as at 114 (Figure 1) and provided with spaced bearing bores 116 and 118 to receive a rotary work-holding and rotating shaft 120 which is journaled in the bearing bores 116 and 118. The bores 116 and 118 have been shown for simplicity as plain bearings but it will be understood that anti-friction bearings, such as tapered roller bearings, are preferably used in the actual machine as built. In order to adjust the position of the work-rotating spindle head 112 back and forth along the bar keys 104 and 106 (Figure 2), the head 112 is provided with a horizontal threaded bore 122 parallel to the axis of the shaft or spindle 120 and likewise parallel to the bar keys 104 and 106 to receive a correspondingly-threaded adjusting screw 124. The adjusting screw 124 passes through a bore 126 in an angle arm 128 which is integral with and forms a continuation of the bar key 104, so that the smooth shank portion 130 of the adjusting screw 124 is journaled and rotates in the bore 126. The adjusting screw 124 is provided with a head 132 which is adapted to receive a wrench or spanner, and also has a retaining collar 134 pinned or otherwise secured thereto on the opposite side of the angle arm 128 from the head 132 so as to prevent axial movement of the adjusting screw 124 while it is being rotated to move the work-rotating unit head 112 to and fro along the key bars 104 and 106 toward and away from the axis of the pivot shaft 88 and arcuate slot center 82 coincident therewith.

Keyed or otherwise drivingly secured to the outer end of the work-rotating spindle or shaft 120 is a pulley 136 (Figures 1 and 2) which is engaged by an endless belt 138 also engaging a drive pulley 140 keyed or otherwise drivingly secured to the drive shaft 142 of a work-rotating electric motor 144. The latter is provided with integral feet 146 which are bolted or otherwise fixedly secured to suitable spaced supporting portions 148 rising from and integral with the spindle head 112. In order to clamp the spindle head 112 in its adjusted position, it is provided with elongated slotted lugs 150 spaced apart from one another (Figure 1) and receiving clamping screws 152 which are threaded into correspondingly-threaded bores (not shown) in the unit base 94.

Bolted or otherwise secured as at 154 to the forward end face 156 of an enlargement 158 on the forward end of the work-rotating spindle or shaft 120 (Figure 6) is an annular stepped backing ring 160 which is bored as at 162 to receive the bolts or screws 154. The central bore 164 in the backing ring 160 is centered by means of a pilot portion 166 coaxial with the shaft or spindle 120 and projecting forwardly from the enlargement 158 thereof. The rearward surface 168 of the backing ring 160 is accurately machined to abut the correspondingly machined surface 156 whereas its forward inner surface 170 is machined to be engaged by the rearward surface 172 of a disc 174 of ferrous metal, such as soft iron which forms a part of the magnetic circuit of a magnetic workpiece holder or back plate, generally designated 176. The remainder of the holder 176 consists of an annular magnet support 178 (Figures 6 to 8 inclusive) which is provided with holes 180 aligned with the holes 162 for receiving the same bolts or screws 154. The magnet support 178 is of non-magnetic material, preferably of non-ferrous metal, such as brass, and has an annular recess 182 in the rear surface thereof for receiving the forwardly-projecting portion 186 of the ring 160 and likewise for receiving the disc 174.

The magnet support 178 has a forwardly-projecting annular portion 188 which is provided with multiple parallel bores 190 arranged in a circular path and adapted to receive bar magnets 192 and 194 in the form of short rods. The bar magnets 192 and 194 are of identical construction but are arranged with their forward ends in alternately varying polarity, i. e., in the order of north pole, south pole, north pole, south pole, etc. on around the circular array of magnets. The bar magnets 192 are preferably of a powerful permanently magnetic material such as the well-known aluminum, nickel and cobalt magnet alloy, and have their rearward ends magnetically engaging the forward surface of the ferrous metal disc 174 (Figure 6). The forwardly-projecting portion 188 of the magnet support 178 originally projects outward to the forward ends of the magnets 192 and 194 but during manufacture, the surplus metal is machined away to the outer and inner edges of the magnets 192 and 194, leaving intervening portions 196 (Figure 8) extending from magnet to magnet in the same annular path occupied by the magnets. The outer ends of the magnets 192 and 194 are disposed in a plane perpendicular to the axis of the work-rotating spindle or shaft 120, so as to receive the flat rearward surface 198 of a workpiece, generally designated 200, which is to be held by the magnets 192 while being rotated, and having an outer end 199.

The workpiece 200 may take many varying forms, as shown in Figures 9 to 35 inclusive. The workpiece 200, chosen for purposes of illustration but not limitation, is a so-called tapered roller bearing cone or inner race for a tapered roller bearing, and as in the form shown in Figure 6, is provided with a central bore 202 which is to be internally ground to fit the shaft or other member upon which it is to be mounted later on. The workpiece 200 is also provided with a tapered or conical annular surface 204 flanked on its opposite edges by annular shoulders 206 and 208 on flanges 207 and 209 respectively, and approximately perpendicular to the axis of the surface 204, and an annular groove 210. The flange 207 has an annular surface 211 adjacent its annular shoulder 206.

External grinding unit

The external grinding unit 46 for grinding the annular conical surface 204 of the workpiece 200 is mounted on the external grinding unit base 212 (Figures 3 and 4), the bottom of which is machined flat to accurately fit the machined top surface 58 of the raised portion or island 54 in the main base 42. The unit base 212 is drilled at spaced locations 214 and 216 to receive the clamping bolts 76 and 78 respectively, the heads of which are inserted in the arcuate T-slots 68 and 70 respectively which, as previously stated, have their centers coincident with the axis or center 82, which is also the center of the arcuate slots 64 and 66 of the work-locating unit 44.

The external grinding unit base 212 is provided with an elongated dovetail groove or guideway 218 which slidably receives the dovetail portion 220 of the external grinding wheel slide 222 (Figure 4). Bolted or otherwise secured as at 224 to the rearward end of the unit base 212 is an upstanding bracket 226 which is drilled as to 228 to receive the threaded end portion 230 of a piston rod 232 (Figure 1), which is adjustably secured therein by lock nuts 234. The piston rod 232 passes through a stuffing box and bore 236 in the end cap 238 of a hydraulic cylinder, generally designated 240, and carries a piston head 242 (Figure 3) reciprocably mounted within the cylinder bore 244. Pipe connections 246 and 248 are provided for supplying pressure fluid to one end of the cylinder 240 while withdrawing it from the other end in order to reciprocate the cylinder 240 relatively to the piston rod 232, which is anchored in an immovable position by the lock nuts 234 on opposite sides of the bracket 226.

The hydraulic cylinder 240 is bolted or otherwise secured as at 250 to the dovetail slide 222 so that reciprocation of the cylinder 240 also reciprocates the slide 222. In order to limit the extent of reciprocation forwardly, the slide 222 is bored and threaded as at 252 to receive the correspondingly-threaded forward end of a stop rod or stud 254, the rearward threaded end 256 of which passes through a hole 258 in the bracket 226 and carries a stop nut 260 (Figure 3).

The forward end of the external grinding wheel slide 222 is provided with a flat upper guide surface 257 with a transverse gib or guide rib 259 upon which is slidably mounted a cross slide 261 with an upstanding portion 262 (Figure 3) containing a guide groove 263 and carrying an electric motor 264, the feet 266 of which are bolted thereto. The motor 264 has a belt 268 (Figure 4) driving a pulley 270 mounted on an external grinding wheel shaft 272 journaled in spaced bearings 274 and 276 mounted on a bore 280 of an external grinding wheel head 278 extending transversely across the unit base 212. The bearings 274 and 276 are shown as plain bearings to simplify the drawing, but are preferably antifriction bearings, such as tapered roller bearings. The shaft 272 at one end carries a retaining collar 282 adjacent the pulley 270. On its other end is mounted a beveled external grinding wheel 284 held in position by a disc 292 and bolt 294 against the shaft enlargement 296 and having oppositely beveled grinding surfaces or paths 286 and 288 meeting one another in an annular line or ridge 290 (Figure 4). The cross slide 261 is reciprocated transversely by a hydraulic cylinder 277 bolted to the external grinding wheel slide 222 (Figure 1) and provided at its opposite ends with pipe connections 279 and 281 connected through a conventional four-way valve to the same hydraulic circuit as the cylinders 240 and 312. Reciprocably mounted in the cylinder 277 is a piston head 283, the piston rod 285 of which is threaded into a threaded hole 287 in the cross slide 261 and locked in position by a lock nut 289.

Internal grinding unit

The internal grinding unit 48 is mounted upon a flat-bottomed unit base 298 accurately fitting the top surface 60 of the portion 56 of the base 40 (Figure 5). The unit base 298 is provided with a longitudinal V-groove 300 (Figure 5) configured to fit the gib or rib 62 so as to slide freely therealong while guided accurately thereby. The unit base 298, therefore, reciprocates, in contrast to the swinging or pivoting motion of the unit bases 94 and 212 of the units 44 and 46 respectively.

In order to reciprocate the unit base 298 back and forth along its guide rib 62, there is provided a piston rod 302, the rearward end 304 of which is threaded to pass through a notch 306 in the rim 52 of the main base 40 and receive lock nuts 308 on opposite sides thereof (Figure 1). The forward end of the piston rod 302 passes through a stuffing box and bore 310 closing the end of a hydraulic cylinder, generally designated 312, having a bore 314 in which reciprocates the piston head 316 on the forward end of the piston rod 302. Pressure fluid is supplied to the opposite ends of the hydraulic cylinder 312 through the pipe connections 318 and 320 to reciprocate the cylinder 312 and unit base 298 relatively to the piston rod 302.

The unit base 298 is provided with a transverse dovetail groove 322 (Figure 2) disposed perpendicularly to the guide rib 62 and slidably receiving the dovetail portion 324 of a cross slide 326 upon which is mounted an internal grinding wheel head 328 surmounted by a motor supporting structure 330. Bolted or otherwise secured to the motor supporting structure 330 are the feet 332 of an electric motor 334 having a drive shaft 336 carrying a drive pulley 338. The drive pulley 338 is belted as at 340 to a driven pulley 342 on the end of an internal grinding wheel shaft 344.

The assembly consisting of the cross slide 326, internal grinding head 328, motor 334 and their associated parts is reciprocated transversely by a hydraulic cylinder 346 having its opposite ends provided with pipe connections 347 and 348 which are connected to a conventional four-way valve in the hydraulic circuit (not shown), as in the case of the hydraulic cylinders 240 and 312 previously described. The opposite ends of the hydraulic cylinder 346 are bolted or otherwise secured to the upper surface of the cross slide 326. Reciprocably mounted in the cylinder bore 349 of the hydraulic cylinder 346 is a piston head 350 mounted on the inner end of a piston rod 351 which passes through a stuffing box or gland 352 and has a threaded portion 353 on its outer end. The threaded portion 353 passes through a hole 354 in an upstanding bracket 355 and carries lock nuts 356 on opposite sides of the bracket 355 for adjustably securing the piston rod 351 to the bracket 355. The lower end of the bracket 355 is bolted or otherwise secured as at 357 to the slide or unit base 298. Consequently, when pressure fluid is supplied to one or the other of the pipe connections 347 or 348, the consequent reciprocation of the hydraulic cylinder 346 relatively to the fixed piston rod 351 causes the cross slide 326 and its associated parts, including the internal grinding wheel head 328 and grinding wheel shaft 344 to move toward or away from the bore 202 in the workpiece 200 (Figure 1).

The internal grinding wheel shaft 344 is journaled in bearings 362 and 364 in a bore 366 in the internal grinding wheel head 328. The bearings 362 and 364 are shown as plain bearings for the sake of simplicity, anti-friction bearings being used in practice. The internal grinding wheel shaft 344 at its forward end is provided with a reduced diameter portion 368 upon which is mounted an internal grinding wheel 370 having a grinding surface 371 adapted to grind the internal bore 202 of the workpiece 200.

Workpiece supporting structure

The workpiece 200, while it is held and rotated by the magnetic chuck 176 (Figures 6 and 7), is supported along its lower portion at approximately 120 degree intervals by a workpiece supporting structure, generally designated 372. The workpiece supporting structure 372 is mounted on an arcuate bracket 374 having at its rearward end an arcuate flange 376 which is drilled at intervals to receive bolts or screws 378 threaded into the correspondingly-spaced threaded holes 380 in the forward end of the work-rotating spindle head 112. The forward end of the arcuate bracket 374 is provided with an arcuate flange 382 containing an arcuate T-slot 384, the center of which is located at the center or axis of rotation 386 of the work-rotating shaft or spindle 120 (Figure 7).

Slidably mounted in the arcuate T-slot 384 are slide blocks 388 and 390 having arcuate ribs 392 extending into the mouth of the slot 384 to insure accurate sliding and prevent pivoting. It will be observed from the position of the section line 6—6 in Figure 7 that the slide block 388 is not shown in Figure 6, but only the slide block 390. The slide blocks 388 and 390 are clamped in the arcuate slot 384 by clamping bolts 394 and 396 respectively. The slide block 388 is grooved radially as at 398 to slidably receive a bar or blade 400. The latter is provided with an elongated slot 402 through which a clamping screw 404 is threaded into the slide block 388 in order to lock the blade 400 in its adjusted position relatively to the slide block 388. The slide block 390, on the other hand, is provided with a groove 406 which is oblique to the radius of the arcuate T-slot 384, and in the groove 406 is slidably mounted a bar or blade 408 which has an arm 410 projecting upward substantially at right angles thereto.

The bars or blades 400 and 408 are drilled transversely to receive pivot pins 412 and 414 respectively, on which are pivotally mounted U-shaped shoes 416 and 418 respectively. The shoes 416 and 418 are preferably made of wear-resistant material such as hardened steel, tungsten-carbide or the like, and they are provided with tips 420 and 422 respectively of shallow V-shaped configuration. The work-rotating shaft 120 and magnetic chuck 176 have an axis of rotation 421 and the circular workpiece 200, a center 423 (Figures 48 and 49) and inner and outer surfaces 202 and 204 (Figures 7 and 42). The grinding machine 40 is provided with workpiece feeding and discharge chutes and mechanisms (not shown) serving the magnetic chuck 176 and workpiece supporting structure 372. These have been known and hitherto used in the centerless grinding industry, hence are outside the scope of the present invention.

Control system

The various motions of the grinding wheel units 46 and 48 are controlled by electrical and hydraulic circuits, including control valves, which are beyond the scope of the present invention and which are omitted from the drawings in order to simplify the showing. For the purposes of the present disclosure, it can be assumed that the hydraulic cylinders 240 and 312 controlling the reciprocation of the external and internal grinding wheel carriages or slides 222 and 298 respectively are controlled manually by conventional four-way hydraulic valves connecting the pipes 246, 248 and 318, 320 to a source of hydraulic pressure fluid, such as a hydraulic pump. Such hydraulic circuits, valves and pumps are well-known to hydraulic and mechanical engineers and their details are outside the scope of the present invention. In the actual machine as constructed for production use, the valves are controlled automatically so that the machine carries out a working cycle automatically without the intervention of the operator. Such a working cycle is shown graphically in Figure 44 and described below in connection with the operation of the invention.

The combined internal and external grinding machine 40 is provided with truing or dressing devices for the grinding wheels 284 and 370 which automatically restore these wheels to their correct configuration after they have been in use during the grinding operations. This automatic wheel-dressing mechanism is also not a part of the present invention and is therefore not shown in the drawings.

Adjustment of machine prior to operation

Prior to operation of the machine 40 of the present invention, a master finished workpiece 200 is placed in the magnetic chuck 176 against its magnets 192 and 194, and the blades or bars 400 and 408 and their slide blocks 388 and 390 are adjusted in arcuate T-slot 384 of the supporting structure 372 so that the workpiece 200 is crowded against the tilting U-shaped work-supporting shoes or rests 416 and 418 while it is being rotated and ground (Figures 6, 7 and 49). In order to enhance this crowding action, the above adjustment is made so that the center 423 of the master finished workpiece 200 lies slightly below and to the right of the axis of rotation 421 of the work-rotating shaft 120. With this condition of adjustment, the resultants 425 and 427 (Figures 48 and 49) of the components 429, 431 and 433, 435 of force (shown in solid lines therein) exerted by the external and internal grinding wheels 284 and 370 respectively upon the workpiece 200 while being rotated and fed thereagainst cooperate with one another to force the workpiece downward against the supporting shoes or rests 416 and 418. The magnetic work holder 176 makes this crowding effect possible by permitting the workpiece 200 to slide slightly relatively to the magnets 192 and 194 thereof because of the difference of location of the centers or axes 421 and 423.

Figure 48 shows the relative positions of these centers 421 and 423 near the start of the grinding operation when both the external and internal grinding wheels 284 and 370 are simultaneously operating to grind the outer and inner surfaces 204 and 202 of the workpiece 200 during the first grinding stage of the operating cycle.

Figure 49, on the other hand, shows the slightly altered relative positions of the centers 421 and 423 during the second grinding stage of the operating cycle near the conclusion of the grinding operation, after stock has been removed and the external grinding wheel 284 has been withdrawn from the outer surface 204 and the internal grinding wheel 370 is completing the finish-grinding operation on the inner surface 202. The work-supporting shoes or rests 416 and 418 are so adjusted in the arcuate slot 384 that the resultant 425 in Figure 48 and the resultant 427 in Figures 48 and 49 when extended fall inside the centers 413 and 415 of the pivot pins 412 and 414 of the work-supporting shoes 416 and 418 in order for the workpiece 200 to be held firmly in position on the shoes 416 and 418. In Figures 48 and 49 is shown the circular path 437 of a point 439 on the magnetic work holder 176 relatively to the workpiece periphery 211 as the work holder slides relatively to the workpiece to force it downward into the V or pocket formed by the rests 416 and 418. Thus, during the first grinding stage (Figure 48), when the simultaneous operation of both grinding wheels 284 and 370 on the workpiece 200 requires the maximum force to be applied to the workpiece to hold it in position, both grinding wheels create force resultants 425 and 427 which perform this function and prevent accidental dislodgement of the workpiece 200 from the rests 416 and 418.

After the foregoing adjustments of the work supporting shoes 416 and 418 have been made, the external and internal grinding wheels 284 and 370 are adjusted to their proper positions relatively to the master workpiece 200 by swinging of the work-rotating unit 44 and external grinding wheel unit 46 in their respective arcuate slots 64, 66, 68 and 70 until the grinding wheels 284 and 370 are properly presented to the outer and inner workpiece surfaces 204 and 202 to be ground, with the grinding wheel edge 290 coinciding with the vertical pivot axis or center 82 (Figure 1). The internal grinding wheel unit 48 remains stationary during such adjustment, except for reciprocation, since it has no arcuate slots by which it can be swung arcuately around the vertical axis or center 82. The precise adjustments of the external and internal grinding wheels 284 and 370 and the configurations of these wheels depend, of course, upon the form of workpiece being ground, a wide variety of such forms being shown in Figures 9 to 41 inclusive, as explained below.

Operation

After the foregoing adjustments have been made, the master workpiece is removed from the machine and a supply of unground workpieces placed in the workpiece-feeding chute (not shown) by which these workpieces are fed one by one to the magnetic workpiece holder 176 and onto the shoes or rests 416 and 418. The particular cycle of operations to be followed depends upon the nature of the workpiece, as indicated by the different cycle diagrams in Figures 44, 45, 46 and 47. In these cycle diagrams, the designation "Cyl. 1" refers to the hydraulic cylinder 240 for reciprocating the external grinding wheel carriage 222 longitudinally to move the external grinding wheel 284 toward and away from the workpiece; "Cyl. 2" refers to the hydraulic cylinder 277 for oscillating the external grinding wheel 284 and its carriage or cross slide 261 along the workpiece in the direction of the axis of the grinding wheel shaft 274; "Cyl. 3" refers to the hydraulic cylinder 312 for oscillating the internal grinding wheel 370 along the workpiece 200; and "Cyl. 4" refers to the hydraulic cylinder 346 for moving the internal grinding wheel 370 into and out of engagement with the workpiece.

The first cycle diagram of Figure 44 is followed for grinding the workpieces shown in Figures 1 to 9 inclusive, and also in Figures 10, 11, 12, 14, 22, 23, 29, 30, 31, 32, 33, 40 and 41. In this first cycle diagram only cylinder 3 (312) is operated in oscillation, so as to oscillate the inner grinding wheel 370 relatively to the workpiece. The second cycle diagram of Figure 45 is used in grinding the workpieces shown in Figures 13, 16, 19, 21, 25, 27 and 28, cylinders 2 and 3 being operated in oscillation by means of the hydraulic cylinders 277 and 312 respectively. The third cycle diagram of Figure 46 is used in grinding the workpieces shown in Figures 15, 17, 18, 20, 24, 34 and 35, cylinder 2 only being operated in oscillation by means of the hydraulic cylinder 277. The fourth cycle diagram of Figure 47 is used in grinding the workpieces shown in Figures 36, 37, 38 and 39, neither of the grinding wheels 284 and 370 being oscillated, hence none of the cylinders being operated in oscillation.

Referring to the first cycle diagram of Figure 44, when the workpiece 200 has been properly loaded into the magnetic holder 176, as indicated by the upwardly-inclined line designated "load work," the workpiece 200 remains in the grinding position for the period indicated by the horizontal line entitled "Work in Grinding Position" throughout the grinding operations. The external grinding wheel carriage 222 (Figure 1) is now moved bodily inward toward the workpiece 200 by the hydraulic cylinder 240 ("Cyl. 1") at a rapid traverse speed indicated in Figure 44 by the upwardly-inclined line designated "Rapid Movement Toward Work," until the grinding wheel 284 is almost in contact with the workpiece 200, ready to begin a feeding stroke.

At the same time, the carriage constituting the base 298 is moved rapidly forward toward the workpiece 200 by the hydraulic cylinder 312, thereby performing the step indicated by the inclined line designated "Rapid Movement Toward Work" in the graph designated "Inside Diameter Grinding," just below the graph designated "Outside Diameter Grinding" in Figure 44, thereby bringing the internal grinding wheel 370 close to the workpiece 200, ready to begin a feeding stroke. Simultaneously with the axial movement of the base or slide 298 of the internal grinding unit 48 by the hydraulic cylinder 312, the cross slide 326 and the internal grinding wheel head 328 (Figures 1 and 2) are moved rapidly inward or rearward away from the bracket 355 at the front of the machine at a rapid traverse speed by the hydraulic cylinder 346 to perform the operation designated "Rapid Movement" indicated by the upwardly-inclined line so designated in the second graph from the bottom entitled "Inside Diameter Grinding Feed Operation" in Figure 44. This action brings the internal grinding wheel 370 into close proximity to the bore 202 of the workpiece 200, ready to begin a feeding stroke. All three carriages and the two grinding wheels 284 and 370 have now arrived at the end of their rapid traverse strokes, and in close proximity to the outer and inner surfaces 204 and 202 of the workpiece 200, ready to begin a grinding operation.

To perform the external grinding operation, as indicated in the uppermost graph in Figure 44 by the gently inclined line designated "Slow Feed Grind," pressure fluid is now supplied more slowly to the hydraulic cylinder 240, causing the carriage or slide 222 and grinding wheel 284 to be moved at a feeding rate into grinding contact with the workpiece and then to halt for a period marked "Dwell" on the same graph. While this is going on, the slide or carriage 298 has been reciprocated to and fro axially at the same time that the cross slide 326 is slowly fed transversely to the axis of rotation, feeding the internal grinding wheel 370 at a slow rate into grinding contact with the bore 202. The first of these two simultaneous operations is shown by the zigzag line of the middle graph entitled "Rough Grind—Oscillation of Head" followed by a slower oscillation entitled "Wheel Dressing" wherein the grinding surface 371 of the internal grinding wheel 370 is automatically trued by a truing device having a diamond or other hard crystal, while the internal grinding wheel 370 is outside the bore 202 being ground.

The second or transverse feeding operation which is being performed upon the internal grinding wheel 371 while it is being oscillated axially is indicated by the gently-inclined portion of the second graph from the bottom entitled "Feed Operation" in Figure 44, and determines the amount of metal removed from the bore 202 during the rough grinding operation thereof. At the conclusion of this feeding operation, the cross slide 326 is caused to halt and dwell, as indicated by the horizontal line marked "Dwell" immediately beyond the gently-inclined line entitled "Feed Operation."

The flow of pressure fluid to the hydraulic cylinder 240 is now reversed and a reverse flow established at a rapid rate, causing the carriage or slide 222 and the external grinding wheel 284 carried by it to move rapidly away from the workpiece 200 and to dwell at its retracted position during the periods of time indicated on the uppermost graph of Figure 44 by the steeply slanting line entitled "Rapid Return" and the horizontal line following it, entitled "Dwell."

The finish grinding of the bore 202 takes place while the external grinding wheel 286 is being rapidly retracted and while it dwells in its retracted position, as just stated above. This finish grinding takes place while the cross slide 326 and the internal grinding wheel 370 are being fed transversely outward for a short interval and then caused to dwell, as indicated by the short inclined line marked "Feed Operation" and the horizontal line marked "Dwell" in the second graph from the bottom of Figure 44. While these finish grind feed and dwell operations are being brought about by the cross slide 326, the slide of base 298 is oscillating to and fro, as indicated by the shorter zigzag line in the third graph from the bottom of Figure 44, entitled "Finish Grind—Oscillation of Head." When these operations of the cross slide 326 and slide 298 have been completed, both are rapidly retracted by reversal of the flow of pressure fluid to their respective hydraulic cylinders 346 and 312, as indicated by the steeply-inclined portions of the second and third graphs from the bottom, marked "Return" and "Rapid Return" respectively. The slides or carriages 222 and 298 and the cross slide 326 now remain in their retracted positions momentarily while the finished workpiece 200 is ejected from the magnetic chuck 176 as indicated by the steeply-inclined line in the lowermost graph of Figure 44, entitled "Unload," completing the cycle. Another workpiece 200 is then fed into the machine from the feed chute (not shown), commencing another cycle of operations as indicated by the steeply-inclined line marked "Load" in the lower left-hand corner of Figure 44, whereupon the foregoing cycle of operations is repeated, as described above. Meanwhile, the finished workpiece is carried away by a discharge chute and deposited in a suitable receptacle.

Thus, during the simultaneous grinding of the external and internal workpiece surfaces 204 and 202 respectively, the external and internal grinding wheels 284 and 370 (Figure 48) cooperate with one another to produce downward forces which hold the workpiece 200 firmly against the shoes or rests 416 and 418 at the very time when both of these grinding wheels are pressing against the workpiece, so that there is no tendency for it to jump out of the pocket formed between the two rests 416 and 418.

*Varieties of workpieces simultaneously ground*

Figures 9 to 41 inclusive show only a few of the wide range of workpieces which can be ground on the machine of the present invention, so that the internal and external surfaces are simultaneously ground.

Figure 9 shows an external grinding wheel 424 with a configuration adapted to grind the workpiece surface 204, the shoulder 206 (Figure 6) and the annular external surface 211 of the flange 207, in addition to internally grinding the surface 202. Thus, the grinding wheel 424 is, in effect, the same as the grinding wheel 284 in that it has the beveled surfaces 286 and 288 plus additional beveled surfaces 426 and 428 fitting the additional external surface 211 being ground.

Figure 10 shows the external surface 204 of the workpiece 200a being ground by the grinding wheel 284 as described above. The workpiece 200a is also the inner race or "cone" of a tapered roller bearing but is provided with a tapered or conical internal bore 202a which is being simultaneously ground by the internal grinding wheel 370 while the axis of its shaft 344 is tilted relatively to the axis of rotation of the workpiece-rotating shaft 120.

Figure 11 shows a workpiece 200b having the same external surfaces as the workpiece 200 and ground by the external grinding wheel 424 of Figure 9. The workpiece 200b is also the inner race or "cone" of a tapered roller bearing, but has a tapered internal bore or surface 202b which is similar to the tapered surface 202a of Figure 10 and is similarly ground by inclining the axis of the internal grinding wheel 370 and its shaft 344 relatively to the axis of rotation of the workpiece-rotating shaft 120.

Figure 12 shows an inner race 430 for a plain roller bearing using cylindrical rollers, wherein the internal surface or bore 432 is ground by the internal grinding wheel 370 on the shaft 344 while the bottom and sides of the annular cylindrical groove 434 are being ground by an external grinding wheel 436 having a cylindrical face 438 and sides 440. The axes of rotation of the internal and external grinding wheels 370 and 436 are parallel during such grinding.

Figure 13 shows an arrangement similar to Figure 12, wherein the external grinding wheel 444 is the same as that used in Figure 12, except that it is slightly wider, and simultaneously grinds the flange 442 of the workpiece 430 but not the roller path or groove 434. The inner surface 432 is simultaneously ground by the grinding wheel 370, as before.

Figure 14 shows the same workpiece 430 with its inner surface 432 being ground by the internal grinding wheel 370. The roller path or groove 434 and the flanges 442, however, are being simultaneously ground by an external grinding wheel 446 having a central portion 448 with outer portions 450 of slightly smaller diameter corresponding to the depth of the groove 434.

Figure 15 shows a workpiece 452 comprising the outer race of a plain cylindrical roller bearing corresponding to the inner race 430 shown in Figure 12, being simultaneously ground internally and externally by the internal grinding wheel 370 and an external grinding wheel 454. The workpiece 452 has coaxial cylindrical inner and outer surfaces 456 and 458 respectively, and a smaller diameter internal surface 460 upon a flange 462 having an annular shoulder 464 therebetween, there being a single flange 462 at one end only of the workpiece 452. In Figure 15, the internal grinding wheel 370 is engaged in simultaneously grinding the internal surface 456 and the annular shoulder 464 but not the smaller diameter internal surface 460.

Figure 16 shows the same elements and workpiece as Figure 15 but in this set-up, the internal grinding wheel 370 is grinding the smaller diameter surface 460 which was not ground in the set-up of Figure 15. Figure 16, therefore, performs a second operation which may precede or succeed the internal surface grinding operation of Figure 15.

Figure 17 shows the workpiece 452 of Figures 15 and 16 with the same mode of external grinding but with an internal grinding wheel 466 having different diameter surfaces 468 and 470 respectively separated by an annular shoulder 472 corresponding to the configuration of the workpiece 452. As a consequence, in Figure 17 the stepped internal grinding wheel 466 simultaneously grinds the coaxial surfaces 456 and 460 of different diameters and the annular shoulder 464 between them.

Figures 18, 19 and 20 show a double-flanged annular workpiece 474 resembling the workpiece 452 but having a similar flange at the opposite end thereof, the workpiece 474 being an external race of a straight roller bearing corresponding to the inner race 430 of Figures 12 to 14 inclusive. In Figure 18, an external grinding wheel 434 is grinding the external surface 476 as in Figures 15 to 17 inclusive, whereas an internal grinding wheel 370 is grinding the internal surface or roller path 478 and the annular shoulders 480 on the flange 482 at the opposite ends of the race, the smaller diameter surfaces 484 being ground in the later operation shown in Figure 19, but by the use of an internal grinding wheel 370 of greater length. Figure 20 shows the grinding of the external surface 476 the same as in Figures 15 to 19 inclusive, but a special internal grinding wheel 486 with a main cylindrical grinding surface 488 and a pair of smaller diameter grinding surfaces 490 separated from one another by an annular shoulder 492 simultaneously grinds the roller path 478, the two annular shoulders 480, and the two smaller diameter coaxial cylindrical surfaces 484 on the two flanges 482 at opposite ends of the workpiece 474.

Figure 21 shows a set-up of the machine with a workpiece 494 having a conical inner surface 496 and a cylindrical outer surface 498 ground simultaneously by the grinding wheels 370 and 454, but with the workpiece-rotating unit 44 and the external grinding unit 46 swung so that their axes of rotation, while parallel to one another, are at an angle to the axis of rotation of the internal grinding wheel shaft 344.

Figure 22 shows the simultaneous external and internal grinding of a slightly different workpiece 500 comprising the workpiece 494 with an internal conical surface 502 and an external cylindrical surface 504, with an external flange 506 forming a larger diameter surface 508 and an annular shoulder 510 therebetween. The grinding wheel 454 in Figure 22 simultaneously grinds the external surface 504 and the annular shoulder 510.

Figure 23 shows a set-up wherein the internal surface 502 of the workpiece 500 is being ground internally in the same manner as in Figure 22 but wherein the external surface 504 and the annular shoulder 510 are being ground simultaneously by an external grinding wheel 512 having similarly beveled portions 514 and 516 with an oppositely-beveled portion 518 between them.

Figure 24 shows an internally-flanged workpiece 520 generally similar to the workpiece 494 of Figure 21 but internally flanged. The workpiece 520 thus has an internal conical surface 522, an internal cylindrical surface 524 on an internal flange 526 with an annular shoulder 528, and an external cylindrical surface 530. The workpiece rotating unit 44 and the external grinding unit 46 carrying the external grinding wheel 454 are tilted relatively to the axis of the internal grinding wheel shaft 344 carrying the internal grinding wheel 370 in order to simultaneously grind the internal conical surface 522, the internal annular shoulder 528, the internal cylindrical surface 524, and the external cylindrical surface 530.

Figures 25 to 27 inclusive show the simultaneous internal and external grinding of a workpiece 532 consisting of the outer race or cup of a double-row tapered roller bearing, the workpiece 532 having oppositely-tapered conical first and second internal surfaces 534 and 536 separated from one another by an annular cylindrical band 538 and a cylindrical external surface 540 having an annular groove 542 of arcuate cross-section outside the band 538. In Figures 25 to 28 inclusive, the workpiece-rotating unit 44 and the external grinding wheel unit 46 carrying the grinding wheel 454 are swung so that their axes are tilted relatively to the axis of rotation of the internal grinding wheel 370 and its shaft 344. In Figure 25, the external cylindrical surface 540 and the second internal conical surface 536 are being simultaneously ground, and in Figure 26, the workpiece ground in Figure 25 has been turned end for end and the first conical internal surface 534 is now being ground. Figure 27 shows an alternative substitute for Figure 26 wherein the workpiece, after the second conical internal surface 536 has been ground as in Figure 25, remains against the holder without being turned end for end as in Figure 26, and the first internal conical surface 534 is ground by shifting of the workpiece-rotating unit 44 and the external grinding unit 46 carrying the external grinding wheel 454 relatively to the internal grinding wheel 370 and its shaft 344 in such a manner as to bring the first internal conical surface 534 of the workpiece 532 into engagement with the internal grinding wheel 370, as indicated by the dotted lines in Figure 27.

Figure 28 shows the simultaneous grinding of a workpiece 544 which is perhaps the simplest workpiece to be simultaneously ground internally and externally. The workpiece 544 has coaxial cylindrical internal and external surfaces 546 and 548 respectively without flanges or shoulders. As a consequence, the axes of rotation of the workpiece-rotating unit 44, the external grinding unit 46 carrying the external grinding wheel 454, and the internal grinding unit 48 carrying the internal grinding wheel 370 and its shaft, are parallel to one another.

Figures 29 and 30 show the simultaneous internal and external grinding of a workpiece 550 having an internal cylindrical surface 552, an external cylindrical surface 554, and an external flange 556 having an external cylindrical surface 558 and an annular shoulder 560 between it and the external cylindrical surface 554. The set-up of the work-rotating unit 44 and the internal grinding unit 48 remains the same as in Figure 28, but the external cylindrical surface 554 and the annular shoulder 560 are simultaneously ground by an oppositely-beveled external grinding wheel 562 having oppositely-beveled surfaces 564 and 566 respectively. The axis of rotation of the grinding wheel 562 is tilted relatively to the parallel axes of rotation of the work-rotating shaft 120 and the internal grinding wheel shaft 344 by swinging of the external grinding wheel unit 46 in the manner previously described. The set-up of Figure 30 is the same as that of Figure 29 insofar as the machine is concerned, except that an external grinding wheel 568 is employed which has similarly beveled surfaces 570 and 572 separated by an oppositely-beveled surface 574 for simultaneously grinding the cylindrical surface 554, the cylindrical surface 558 and the annular shoulder 560 between them, respectively.

Figures 31 and 33 show the simultaneous internal and external grinding of a workpiece 576 consisting of the inner race of an annular anti-friction ball bearing. The workpiece 576 has an internal cylindrical surface 578 and a pair of external cylindrical surfaces 580 separated from one another by an annular grooved surface or ball path 582 of arcuate cross-section. The workpiece-rotating shaft 120 of the workpiece-rotating unit 44 and the internal grinding wheel shaft 344 of the internal grinding wheel 370 are set up, as before, on parallel axes. The external grinding of the ball path 582 is performed by an external grinding wheel 584 having a periphery 586 of arcuate cross-section. The external grinding wheel 584, however, is set up to rotate on an axis of rotation parallel to the axes of rotation of the shafts 120 and 344 of the workpiece-rotating unit 44 and internal grinding unit 48 by appropriate swinging of the external grinding unit 46. The set-up in Figure 33 is substantially the same as that of Figure 31, except that the outlying cylindrical surfaces 580 are being ground simultaneously with the central annular ball path 582 by use of a special external grinding wheel 588 having a central annular portion 590 of arcuate cross-section corresponding to the ball path 582 and cylindrical outlying portions 592 corresponding to the cylindrical outlying surfaces 580. The set-up of Figure 33 eliminates the necessity for separately grinding the outlying external cylindrical surfaces 580, if this is desired, as would be necessary in the set-up of Figure 31 and in Figure 32 about to be described.

Figure 32 shows a workpiece 594 consisting of an inner ball race resembling the workpiece 576 insofar as it has a central ball path 596 and outlying external cylindrical surfaces 598 on opposite sides thereof. It differs, however, in having an internal conical surface 600, so that while the grinding set-up for the external surfaces remains the same, the workpiece-rotating unit 44 and the external grinding unit 46 must be swung relatively to the internal grinding unit 48 in order to tilt them and the workpiece 594 relatively to the internal grinding wheel shaft 344 and its grinding wheel 370 to simultaneously grind the external ball path 596 and the internal conical surface 600.

Figures 34 and 35 show the simultaneous internal and external grinding of a workpiece 602 having a central annular internal surface of arcuate cross-section 604 flanked on opposite sides by annular cylindrical surfaces 606 and an external cylindrical surface 608, the workpiece 602 constituting the outer race of an anti-friction ball bearing. The set-up of the machine is substantially the same as that shown in Figure 31 for the workpiece or inner race 576 except that the grinding wheels are different. The outer cylindrical surface 608 is ground by the grinding wheel 454 previously mentioned and the internal grinding of the annular ball path 604 of arcuate cross-section is performed by an internal grinding wheel 610 mounted on the shaft 344 and having a rounded peripheral surface 612 of arcuate cross-section corresponding to the ball path 604. The axes of rotation of the shafts 120, 272 (not shown) and 344 of the workpiece-rotating unit 44, the external grinding unit 46 and internal grinding unit 48 are parallel as in Figure 31. In this set-up of Figure 34, however, the outlying internal cylindrical surfaces 606 are ground in a separate operation by a cylindrical internal grinding wheel, such as the grinding wheel 370 on the shaft 344 shown in Figures 31 and 33 and elsewhere.

To accomplish the simultaneous grinding of the external cylindrical surface 608 and the ball path 604 with its outlying cylindrical surfaces 606, the same set-up is used as in Figure 34, with the same external grinding wheel 454, but with a different internal grinding wheel 614 upon the internal grinding wheel shaft 344. The internal grinding wheel 614 has a central annular rounded portion 616 of arcuate cross-section corresponding to the curvature of the internal ball path 604, flanked on its opposite sides by cylindrical grinding wheel portions 618 corresponding to and engaging the internal cylindrical surfaces 606.

Figures 36 to 39 inclusive show the simultaneous internal and external grinding of a workpiece 620 which is similar in most respects to the workpiece 602, similar parts being similarly designated by the same reference numerals, and differing by the provision of an annular flange 622 at one end having an annular cylindrical surface 624 with an annular shoulder 626 between it and the outer surface 608. The set-up of the machine is similar to that of Figures 34 and 35, and a similar procedure is followed as to the internal surfaces 604 and 606, by use of a similar internal grinding wheel 610 mounted on the shaft 344 and having a rounded peripheral surface 612 for the ball path surface 604. The outlying internal cylindrical surfaces 606 may either be ground in a separate operation by the cylindrical internal grinding wheel 370 on the shaft 344 shown in Figures 31, 33, 40, 41 and elsewhere, or they may be ground simultaneously with the ball path surface 604 by means of the internal grinding wheel 614 of Figure 35 with a central rounded peripheral portion 616 for the ball path portion 604 (Figures 38 and 39) and a pair of cylindrical grinding wheel portions 618 on opposite sides thereof for grinding the outlying internal cylindrical surfaces 606. The grinding of the internal surfaces 604 (Figures 36 and 37) and the simultaneous grinding of the surfaces 604 and 606 (Figures 38 and 39) must be done by the so-called "plunge-cut" procedure analogous to that which must be followed in the grinding of the central portion of the internal surfaces of the workpieces shown in Figures 18, 20, 34, and 35 and in the grinding of the central portions of the external surfaces of the workpieces of Figures 12, 14, 31, 32 and 33 where the grinding wheel cannot be oscillated axially because of the grooved nature of the central surfaces. In grinding internal surfaces of this nature, the internal grinding wheel must be moved into the bore longitudinally of its axis of rotation, then moved transversely into the central portion of the bore to grind the central portion internally (Figures 36 and 37) or to grind all portions of the inner surface simultaneously (Figures 38 and 39).

The grinding of the flanged or shouldered external surfaces 608, 626, 624 of the workpiece 620 simultaneously with the grinding of the internal surface follows an analogous procedure and uses similar wheels to the grinding of the similar external surfaces of workpieces previously described. In Figure 36, the external surfaces 608 and 626 are ground simultaneously by a beveled grinding wheel, generally designated 630, having grinding portions 632 and 634 inclined at right angles to one another corresponding to the perpendicularity of the surfaces 608 and 626. In this set-up, the surface 624 has to be ground separately by an additional pass of the surface portion 632 of the grinding wheel 630 after the latter has been retracted a sufficient distance to reach the larger-diameter surface 624. Figures 38 and 40 show the same procedure applied by the same wheel 630 to the same surfaces 608 and 626.

Figures 37, 39 and 41 show the simultaneous grinding of the external surface portions 608, 626 and 624 of the workpiece 620 by a doubly-beveled grinding wheel 640 having mutually perpendicular portions 641 and 642 for grinding the workpiece surfaces 608 and 626 and having a reversely perpendicular surface portion 644 perpendicular to the surface portion 642 and hence parallel to the surface 641 for grinding the cylindrical portion 624 forming the outer surface of the flange 622.

The modified set-up shown in Figure 43 is for the same purpose as that shown in Figure 7, which it closely resembles, except that in place of the bars or blades 400 and 408 with their pivot pins 412 and 414 and their rocking U-shaped shoes or work-piece rests 416 and 418, plain or rigid blades 650 and 652 are employed. The blade 650, like the blade 400, has an elongated slot 654 for receiving the screw 404 by which it is adjustably clamped to the slide block 388, but the outer end 656 of the blade 650 directly engages the outer surface 204 of the workpiece 200. The blade or workpiece support 652 also has an elongated slot 654 for a clamping screw 404 by which it is secured to its respective slide block 390, and an arm 660 projecting upward substantially at right angles to the main portion 658 of the blade 652, with a further right-angled portion 662 parallel to the main portion 658 of the blade 652. The portion 662 terminates in a surface 664 which directly engages the outer surface 204 of the workpiece 200. The blades 650 and 652 may be made of hardened steel or their tips adjacent the work-supporting end surfaces 656 and 664 may be formed of tungsten carbide or other extremely hard and wear-resisting material. The adjustment of the fixed or rigid blades 650 and 652 of Figure 43 is similar to that described in connection with the rocking support blades 400, 416 and 408, 418 of Figure 7, hence requires no detailed description.

*Modified operating cycles for grinding modified workpieces*

As briefly stated above at the commencement of the description of the first operating cycle diagram of Figure 44, the second, third and fourth operating cycle diagrams of Figures 45, 46 and 47 respectively follow slightly different procedures for adapting them to the production of workpieces of different configurations. The second cycle diagram of Figure 45 is used in grinding the workpieces shown in Figures 13, 16, 19, 21, 25, 26, 27 and 28, as stated above. The general procedure shown graphically in Figure 45 is similiar to that described in connection with the first operating cycle diagram of Figure 44, especially as regards the motions controlled by the hydraulic cylinders 240 ("Cyl. 1"), 312 ("Cyl. 3"), and 346 ("Cyl. 4"). In the second operating cycle diagram of Figure 45, however, the hydraulic cylinder 277 ("Cyl. 2") is operated to oscillate the cross slide 261 in the direction of the axis of rotation of the external grinding wheel during the grinding operation, as indicated by the wavy line in the central portion of the second graph from the top of Figure 45 designated "Cyl. 2" and having beneath it the words "Oscillation of Head."

The third operating cycle diagram of Figure 46, as previously stated, pertains to the grinding of the workpieces shown in Figures 15, 17, 18, 20, 24, 34 and 35, and the general procedure shown graphically in Figures 44 and 45 also applies generally to Figure 46 with the following exceptions. The grinding of the external surface of the workpiece, designated "O. D. Grind" in Figure 46 is substantially the same as in Figure 45 as regards the motion and oscillation of the external grinding wheel, as shown by the similarity of the graphs designated "Cyl. 1" and "Cyl. 2." In grinding the internal surface according to the third cycle diagram of Figure 46, however, the internal grinding wheel is not oscillated, as indicated by the absence of the wavy line in the third graph of Figure 46, designated "Cyl. 3" wherein the portion entitled "Wheel in Position for Grinding" is straight rather than wavy. The feeding movement of the internal grinding wheel in Figure 46 is also similar to that of Figures 44 and 45, except that the internal grinding wheel is shown as having a rapid return, a dwell, and a rapid advance between rough grinding and finish grinding while the internal grinding wheel is being dressed or trued, as indicated by the caption "Wheel In and Out of Work for Dressing Every Cycle" in the graph designated as "Cyl. 3."

The fourth operating cycle diagram of Figure 47, as previously stated, is used in grinding the workpieces shown in Figures 36, 37, 38 and 39 employing the so-called "plunge cut" mode of grinding wherein the configuration of the workpiece does not permit the oscillation of either the external or internal grinding wheel. Accordingly, none of the graphs shown in Figure 47 indicates oscillation of the grinding wheel head by the wavy lines of Figures 44, 45 and 46. The upper two graphs of Figure 47, pertaining to the motions of the external grinding wheel, and designated "Cyl. 1" and "Cyl. 2" are therefore the same as in Figure 44 and the same remarks apply. The lower two graphs in Figure 47, designated "Cyl. 3" and "Cyl. 4" are furthermore the same as the lower two graphs similarly designated in Figure 46, and the same remarks as regards Figure 46 also apply to Figure 47 in that respect. The lowermost graphs entitled "Load Work," etc. are the same in all four operating cycle diagrams since the workpiece is loaded, held in the grinding position, and unloaded in substantially the same sequence and for substantially the same periods of time in all four operating cycle diagrams.

What we claim is:

1. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece-grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheel simultaneously engage the internal and external workpiece surfaces, said workpiece holder including a magnetic device having a substantially flat work-piece-engaging surface disposed perpendicular to its axis of rotation for holding workpieces of magnetically-attracted material, said holder having an abutment surface engageable with the back surface of the workpiece, and a workpiece rest support disposed adjacent said holder and having a plurality of circumferentially-spaced workpiece rests engageable with the lower external portion of the workpiece, said magnetic device having sufficient magnetic attractive power to hold the workpiece against said workpiece-engaging surface while permitting slippage of the workpiece thereacross against said workpiece rests in response to force exerted on the workpiece as a result of the rotation of the grinding wheels against the workpiece.

2. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece-grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, said workpiece holder including a magnetic device having a substantially flat workpiece-engaging surface disposed perpendicular to its axis of rotation for holding workpieces of magnetically-attracted material, said holder having an abutment surface engageable with the back surface of the workpiece, and a workpiece rest support disposed adjacent said holder and having an arcuate guideway thereon and a plurality of circumferentially-spaced workpiece rests adjustably mounted in said arcuate guideway and engageable with the lower external portion of the workpiece, said magnetic device having sufficient magnetic attractive power to hold the workpiece against said workpiece-engaging surface while permitting slippage of the workpiece thereacross against said workpiece rests in response to force exerted on the workpiece as a result of the rotation of the grinding wheels against the workpiece.

3. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece-grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, said workpiece holder including a magnetic device having a substantially flat workpiece-engaging surface disposed perpendicular to its axis of rotation for holding workpieces of magnetically-attracted material, said holder having an abutment surface engageable with the back surface of the workpiece, and a workpiece rest support disposed adjacent said holder and having a plurality of circumferentially-spaced workpiece rests adjustably mounted on said support and having work-contacting elements rockably mounted thereon and engageable with the lower external portion of the workpiece, said magnetic device having sufficient magnetic attractive power to hold the workpiece against said workpiece-engaging surface while permitting slippage of the workpiece thereacross against said workpiece rests in response to force exerted on the workpiece as a result of the rotation of the grinding wheels against the workpiece.

4. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, said base structure beneath two of said units having arcuate guideways with their centers of curvature disposed in coincidence at a common pivot axis, and said workpiece-rotating unit and said external grinding unit being slidably mounted arcuately on said guideways.

5. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, said base structure beneath said rotating unit and said external grinding unit having arcuate guideways with their centers of curvature disposed in coincidence at a common pivot axis, and said workpiece-rotating unit and said external grinding unit being slidably mounted arcuately on said guideways.

6. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece-grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, two of said units being pivotally mounted on said base structure for swinging adjustment around a common pivot axis, said base structure beneath the third of said units having a rectilinear guideway thereon directed toward said common pivot axis, and said third unit being slidably mounted on said rectilinear guideway.

7. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, said base structure beneath two of said units having arcuate guideways with their centers of curvature disposed in coincidence at a common pivot axis, said two last-mentioned units being slidably mounted arcuately on said guideways, the third of said units also having a second rectilinear guideway thereon directed transversely to the axis of rotation of its respective shaft, said shaft being shiftable transversely to its axis of rotation along said second rectilinear guideway.

8. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece-grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, two of said units being pivotally mounted on said base structure for swinging adjustment around a common pivot axis, said base structure beneath said internal grinding unit having a rectilinear guideway thereon directed toward said common pivot axis and said internal grinding unit being slidably mounted on said rectilinear guideway.

9. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece-grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, two of said units being pivotally mounted on said base structure for swinging adjustment around a common pivot axis, said base structure beneath said internal grinding unit having a rectilinear guideway thereon directed toward said common pivot axis and said internal grinding unit being slidably mounted on said rectilinear guideway, said internal grinding unit also having a second rectilinear guideway thereon directed transversely to the axis of rotation of its respective shaft, said shaft being shiftable transversely to its axis of rotation along said second rectilinear guideway.

10. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece-grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, two of said units being pivotally mounted on said base structure for swinging adjustment around a common pivot axis, said external workpiece-grinding unit having a rectilinear guideway thereon disposed above its respective arcuate guideway and directed toward said common pivot axis, said external grinding wheel shaft being shiftably mounted for motion along said last-mentioned rectilinear guideway.

11. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece-grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, two of said units being pivotally mounted on said base structure for swinging adjustment around a common pivot axis, said base structure beneath said internal grinding unit having a rectilinear guideway thereon directed toward said common pivot axis, said internal grinding unit being slidably mounted on said rectilinear guideway, said external workpiece-grinding unit having a rectilinear guideway thereon disposed above its respective arcuate guideway and directed toward said common pivot axis, said external grinding wheel shaft being shiftably mounted for motion along said last-mentioned rectilinear guideway.

12. A centerless simultaneous external and internal workpiece surface grinding machine comprising a base structure, a workpiece-rotating unit mounted on said base structure and having journaled therein a workpiece-rotating shaft with a workpiece holder mounted thereon, an external workpiece-grinding unit mounted on said base structure and having journaled therein an external grinding wheel shaft with an external grinding wheel mounted thereon, an internal workpiece-grinding unit mounted on said base structure and having journaled therein an internal grinding wheel shaft with an internal grinding wheel mounted thereon, and motor-operated driving means drivingly and rotatingly connected to said shafts, said grinding wheel shafts being so positioned relatively to said workpiece-rotating shaft that said grinding wheels simultaneously engage the internal and external workpiece surfaces, two of said units being pivotally mounted on said base structure for swinging adjustment around a common pivot axis, said base structure beneath said external and internal grinding units having rectilinear guideways thereon, slides reciprocably mounted on said guideways, rectilinear cross-guideways mounted on said slides transversely to said guideways, and cross-slides reciprocably mounted on said cross-guideways, said grinding wheel shafts being rotatably mounted on said cross-slides.

13. A method of grinding a workpiece of annular cross-section having an axis of symmetry passing through its center, said method comprising holding said workpiece for rotation about an axis of rotation substantially coincident with said axis of symmetry, rotating said workpiece while it is so held, abrading the outer and inner surfaces of said workpiece simultaneously during rotation thereof, halting the abrading of the outer surface of the workpiece, and continuing the abrading of the inner surface of the workpiece.

14. A method of grinding a workpiece of annular cross-section having an axis of symmetry passing through its center, said method comprising holding said workpiece for rotation about an axis of rotation substantially coincident with said axis of symmetry, rotating said workpiece while it is so held, abrading the outer and inner surfaces of said workpiece simultaneously during rotation thereof, halting the abrading of the outer surface, truing the inner surface abrading means to correct for wear thereof occurring during the first inner surface abrading step, and reabrading the inner surface with the thus trued abrading means.

References Cited in the file of this patent
UNITED STATES PATENTS

| | | |
|---|---|---|
| 530,292 | Trask | Dec. 4, 1894 |
| 1,294,024 | Arter | Feb. 11, 1919 |
| 1,743,116 | Cook | Jan. 14, 1930 |
| 1,841,809 | Heald | Jan. 19, 1932 |
| 1,842,375 | Einstein | Jan. 26, 1932 |
| 2,221,827 | Wildhaber | Nov. 19, 1940 |
| 2,333,411 | Cramer | Nov. 2, 1943 |
| 2,478,607 | Theler | Aug. 9, 1949 |
| 2,646,652 | Blood | July 28, 1953 |
| 2,694,883 | Balsiger | Nov. 23, 1954 |